(12) United States Patent
Kawabe et al.

(10) Patent No.: US 10,486,746 B2
(45) Date of Patent: Nov. 26, 2019

(54) SUBSTRUCTURE OF VEHICLE BODY

(71) Applicant: HONDA MOTOR CO., LTD., Tokyo (JP)

(72) Inventors: Satoru Kawabe, Wako (JP); Shutaro Sao, Wako (JP); Ken Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/897,485

(22) Filed: Feb. 15, 2018

(65) Prior Publication Data

US 2018/0237075 A1    Aug. 23, 2018

(30) Foreign Application Priority Data

Feb. 17, 2017    (JP) .................................. 2017-027647

(51) Int. Cl.
*B60K 1/04*        (2019.01)
*B62D 21/15*       (2006.01)
(Continued)

(52) U.S. Cl.
CPC .............. *B62D 21/157* (2013.01); *B60K 1/04* (2013.01); *B60L 50/66* (2019.02);
(Continued)

(58) Field of Classification Search
CPC .... B62D 21/157; B62D 25/025; B62D 25/20; B62D 25/2036; B60K 1/04;
(Continued)

(56) References Cited

U.S. PATENT DOCUMENTS 6,409,257 B1 *  6/2002  Takashina ............ B62D 21/157
                                                  296/187.12
2002/0043821 A1   4/2002  Takashina et al.
(Continued)

FOREIGN PATENT DOCUMENTS

JP    H01-165779 U    11/1989
JP    2002-120766 A    4/2002
(Continued)

OTHER PUBLICATIONS

Japanese Office Action with English translation, dated Oct. 2, 2018, 12 pages.

*Primary Examiner* — Joseph M Rocca
*Assistant Examiner* — Hilary L Johns
(74) *Attorney, Agent, or Firm* — Rankin, Hill & Clark LLP

(57) ABSTRACT

A side sill structure included in a substructure of a vehicle body, includes a battery pack disposed below a floor panel, a side sill disposed at an outer part in a vehicle width direction and extending in a front-rear direction of the vehicle body, and a stiffener disposed inside a cross section of the side sill and extending along an extending direction of the side sill. The stiffener is composed of an outer stiffener bulging outward in the vehicle width direction, and an inner stiffener bulging inward in the vehicle width direction. In the side sill structure, a first side surface of the stiffener, formed on the inner stiffener, is shifted to a relatively upper side than a second side surface of the stiffener, formed on the outer stiffener, and the battery pack is supported on a lower surface of the side sill.

5 Claims, 15 Drawing Sheets

(51) Int. Cl.
*B60L 50/60* (2019.01)
*B62D 25/02* (2006.01)
*B62D 25/20* (2006.01)

(52) U.S. Cl.
CPC ............... *B60K 2001/0438* (2013.01); *B60K 2001/0472* (2013.01); *B60Y 2306/01* (2013.01); *B62D 25/025* (2013.01); *B62D 25/20* (2013.01); *B62D 25/2036* (2013.01); *Y02T 10/705* (2013.01); *Y02T 10/7005* (2013.01)

(58) Field of Classification Search
CPC .... B60K 2001/0438; B60K 2001/0472; B60L 11/1877; B60L 50/66; B60Y 2306/01; Y02T 10/7005; Y02T 10/705
USPC .......................................................... 180/68.5
See application file for complete search history.

(56) References Cited

U.S. PATENT DOCUMENTS

2012/0256446 A1* 10/2012 Yasuhara ............... B62D 21/11
296/193.07
2014/0174121 A1 6/2014 Hirayama et al.

FOREIGN PATENT DOCUMENTS

| JP | 2003-205868 A | | 7/2003 |
|---|---|---|---|
| JP | 2013-154880 A | | 8/2013 |
| JP | 2013154880 A | * | 8/2013 |
| JP | 2014-124971 A | | 7/2014 |

* cited by examiner

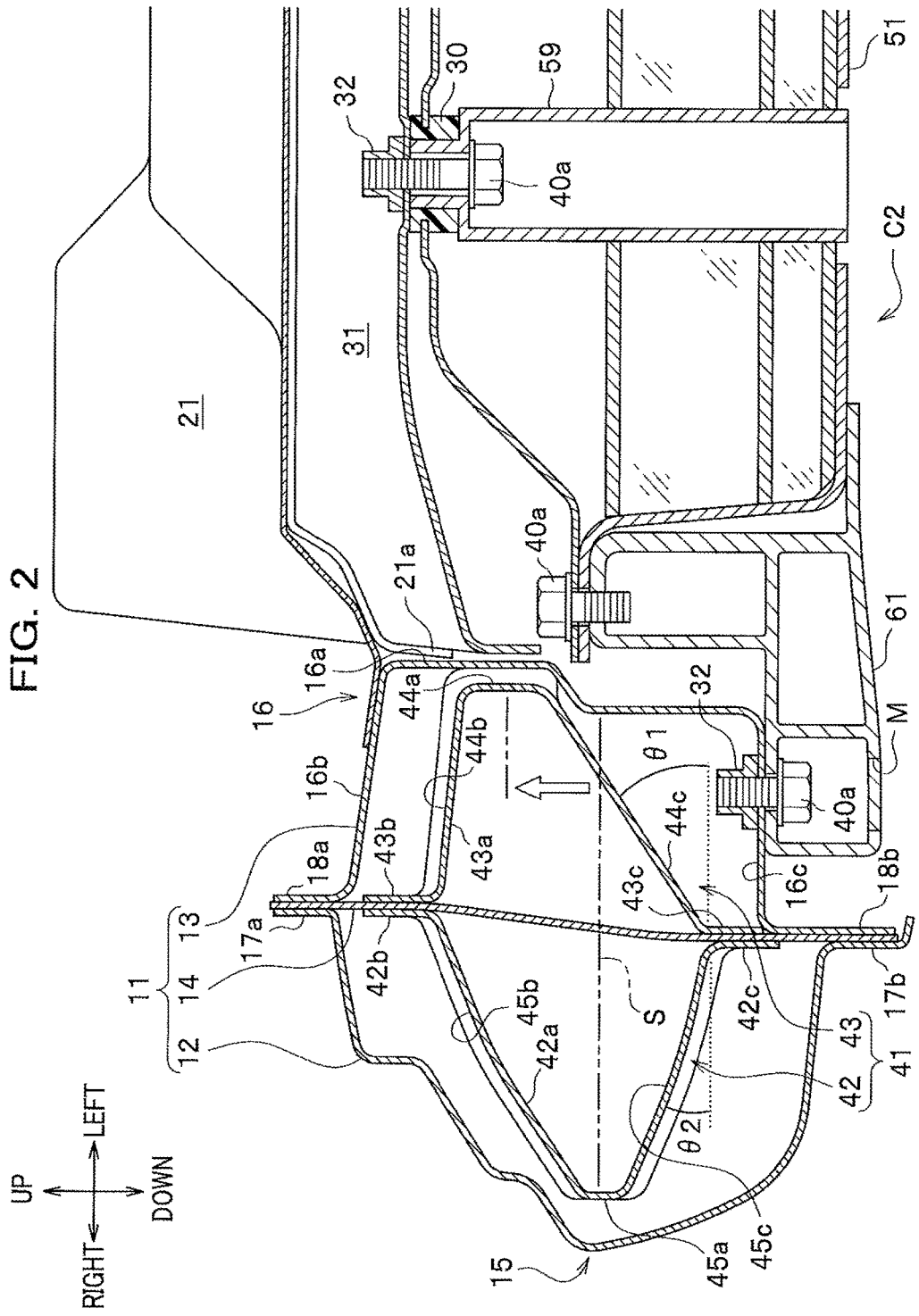

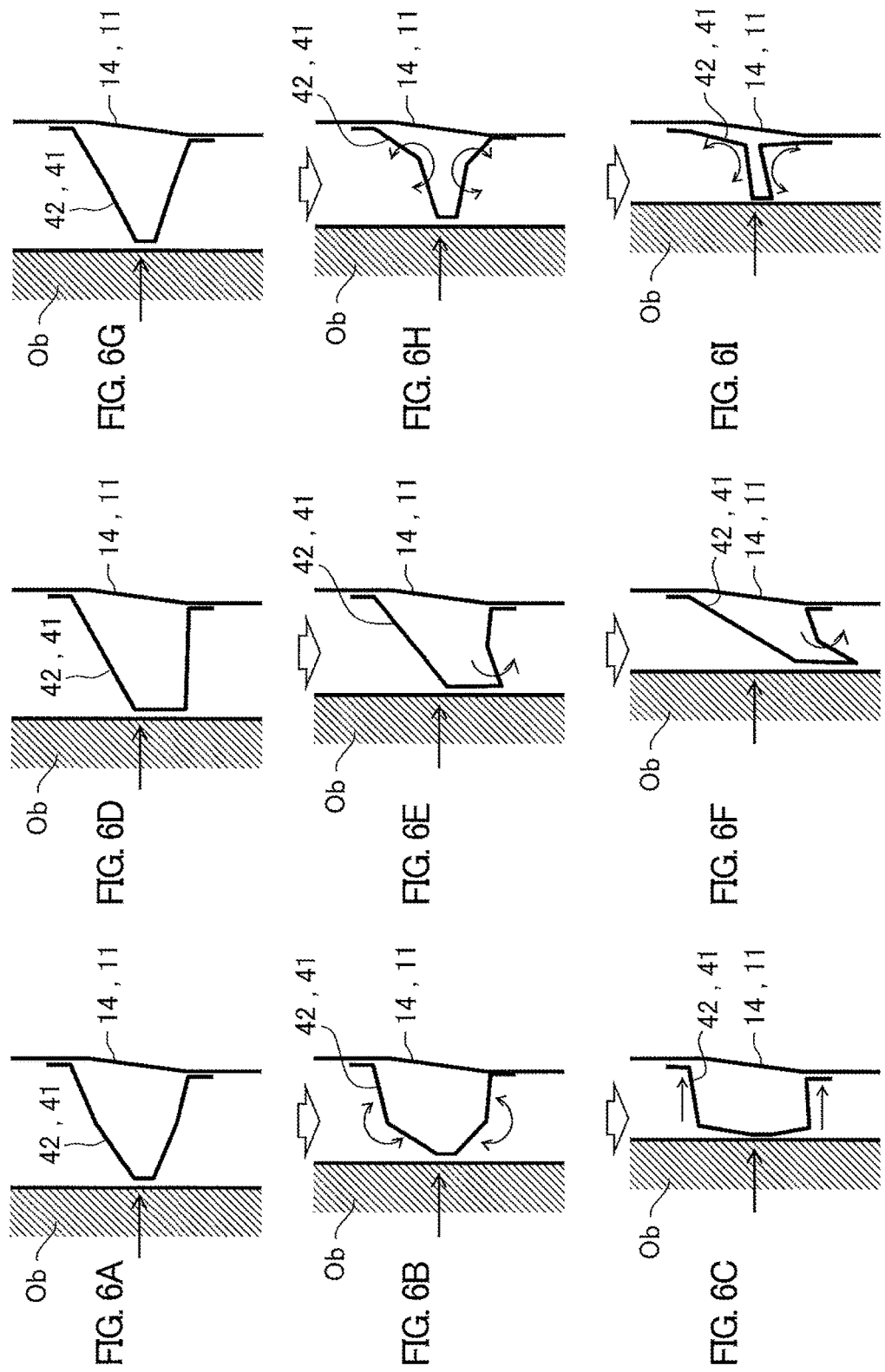

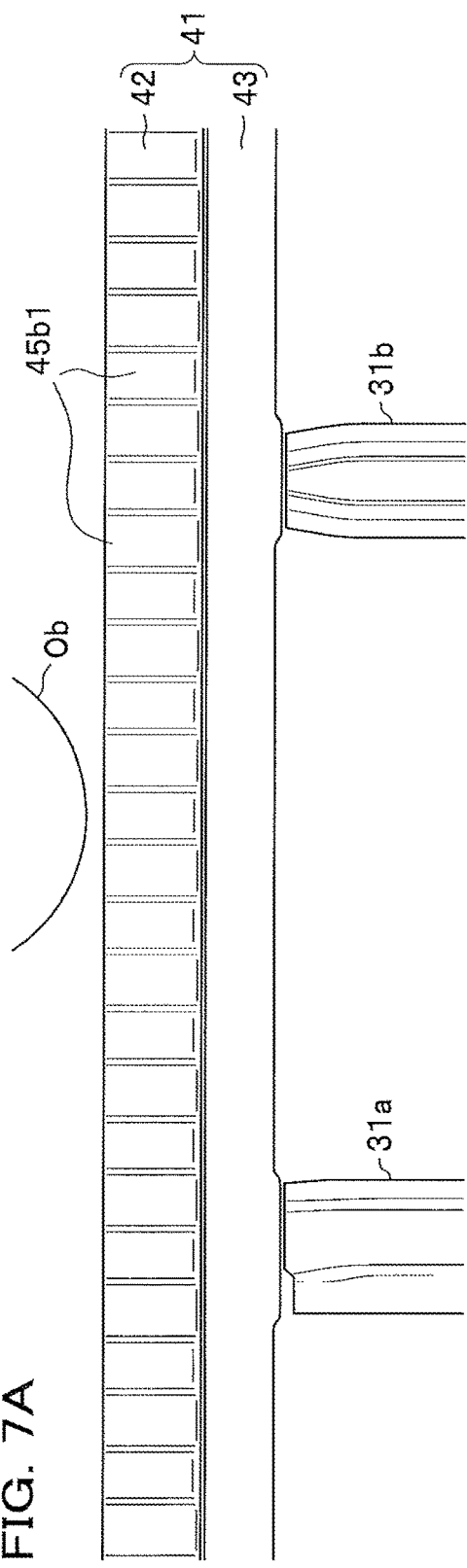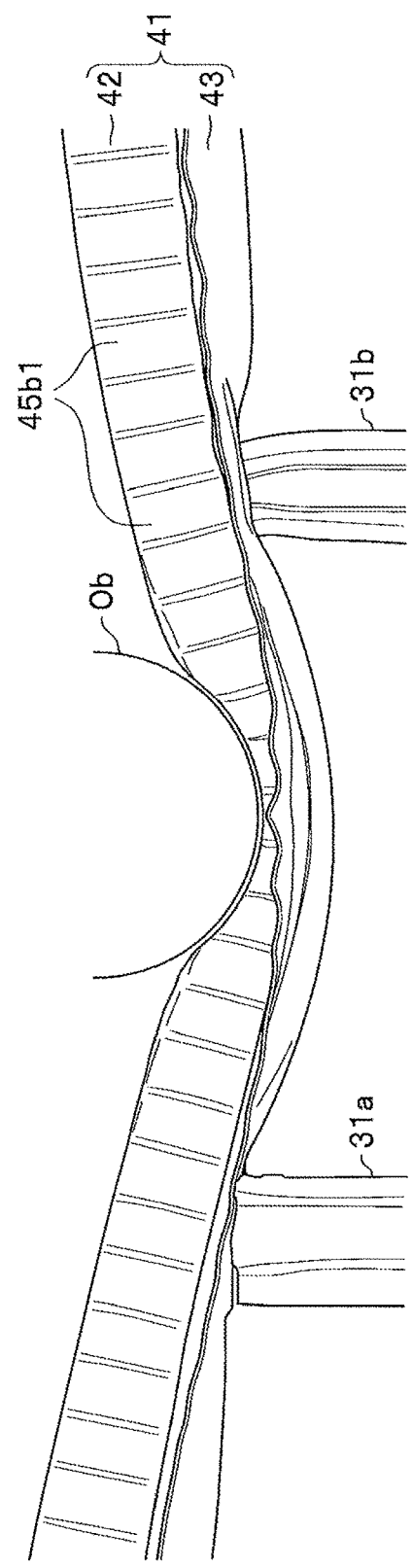

SUBSTRUCTURE OF VEHICLE BODY

CROSS-REFERENCE TO RELATED APPLICATION

This application is based upon and claims priority from the Japanese Patent Application No. 2017-027647, filed on Feb. 17, 2017, the entire contents of which are incorporated herein by reference.

BACKGROUND OF THE INVENTION

1. Field of the Invention

The present invention relates to a substructure of a vehicle body.

2. Description of the Related Art

In conventional art, a substructure of a vehicle body having a battery pack disposed below a floor panel is known (for example, see Patent document 1: Japanese Unexamined Patent Application Publication No. 2014-124971). The substructure of the vehicle body is provided with stiffeners each having a U-shaped cross section and each disposed in a side sill that is disposed at an outer part in a width direction of the vehicle body.

The substructure of the vehicle body thus configured is adapted to absorb a load in side collision of the vehicle, through the stiffeners.

However, the substructure of the vehicle body having the battery pack disposed below the floor panel requires allowing a collision load to be absorbed more efficiently on the vehicle body side. Therefore, it is demanded for the substructure of the vehicle body to allow a collision load input to the side sill to be efficiently transmitted to an inner side in the width direction of the vehicle body.

The present invention has therefore been made in view of the above problem, and an object of the invention is to provide a substructure of a vehicle body capable of allowing a collision load input to a side sill to be efficiently transmitted to an inner side in a width direction of the vehicle body.

SUMMARY OF THE INVENTION

In order to solve the above problem, according to an aspect of the present invention, a substructure of a vehicle body reflecting one aspect of the present invention includes: a battery pack that is disposed below a floor panel; at least one side sill that is disposed at an outer part in a width direction of the vehicle body and extends in a front-rear direction of the vehicle body; and a stiffener that is disposed inside a cross section of the side sill and extends along an extending direction of the side sill, the stiffener being composed of an outer stiffener that has a nearly hat-shaped cross section and bulges outward in the width direction of the vehicle body, and an inner stiffener that has a nearly hat-shaped cross section and bulges inward in the width direction of the vehicle body, wherein a first side surface of the stiffener, which is formed on the inner stiffener, is shifted to a relatively upper side than a second side surface of the stiffener, which is formed on the outer stiffener, and the battery pack is supported on a lower surface of the side sill.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

FIG. 2 is a sectional view of a side sill structure, taken along line II-II in FIG. 1.

FIGS. 6A to 6C are schematic diagrams each showing a state in which an outer stiffener in the present embodiment is deformed in side collision, and FIGS. 6D to 6F and FIGS. 6G to 6I are reference diagrams which are compared with FIGS. 6A to 6C.

FIGS. 7A and 7B are schematic diagrams showing a state of deformation of the stiffener encountered when a load in side collision is input via an object to the stiffener having an outer stiffener and an inner stiffener, the outer stiffener having beads, and the inner stiffener not having beads.

DETAILED DESCRIPTION OF THE PREFERRED EMBODIMENTS

Hereinafter, one or more embodiments of the present invention will be described with reference to the drawings. However, the scope of the invention is not limited to the disclosed embodiments.

Detailed description will be given of a substructure of a vehicle body according to a mode for carrying out the present invention (present embodiment). The vehicle body in the present embodiment assumes application thereof to a vehicle equipped with a secondary battery of high capacity, such as an electric vehicle, a hybrid vehicle or a fuel-cell vehicle.

Figure 1:
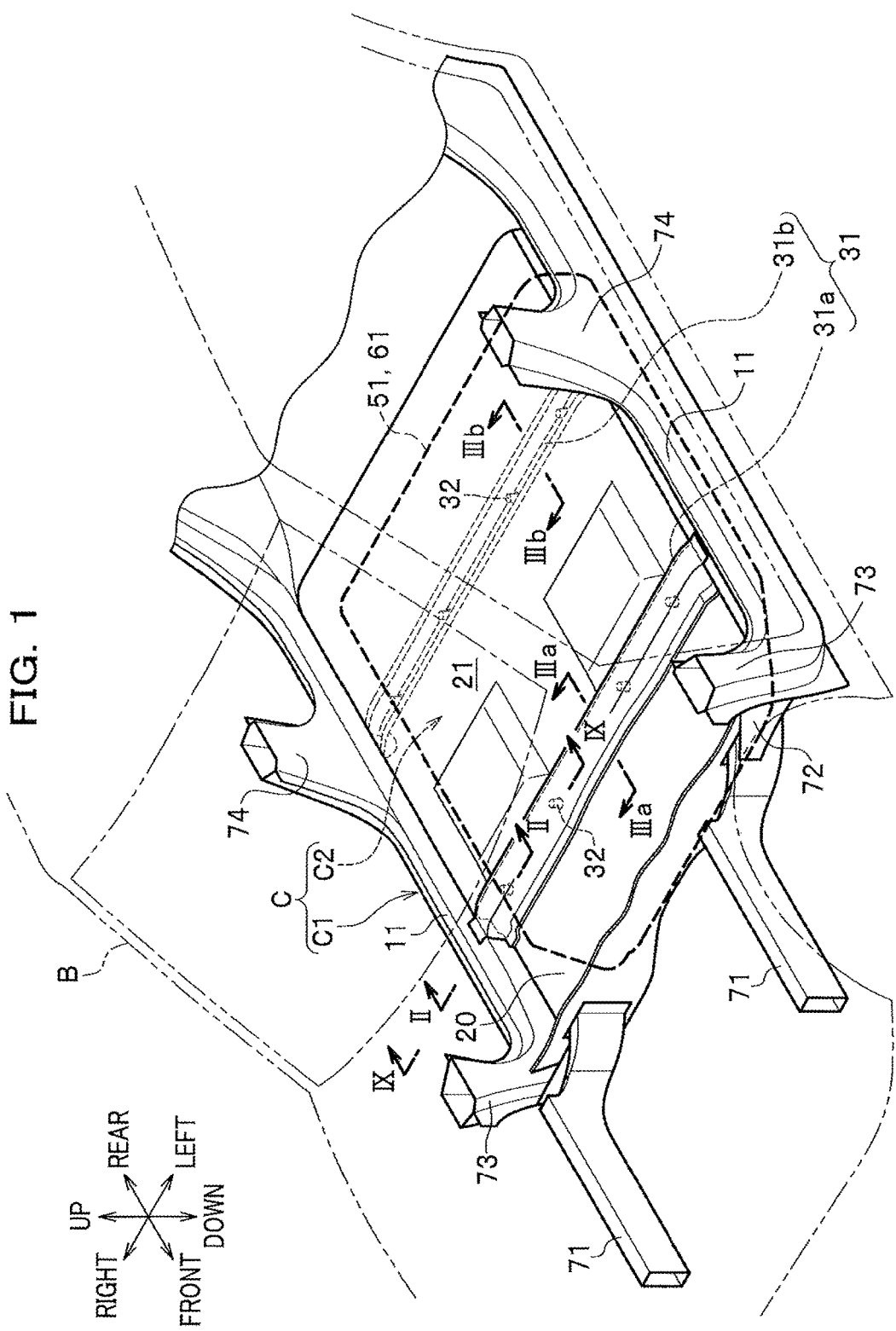
FIG. 1 is an entire perspective view of a substructure of a vehicle body according to an embodiment of the present invention.

FIG. 1 is an entire perspective view of a substructure C of a vehicle body B according to the present embodiment. Note that in the description below, front and rear, right and left, and up and down directions mean directions viewed from an occupant sitting in the driver's seat, and are based on the front-rear, right-left and up-down directions indicated by arrow marks in FIG. 1. The right-left direction shown in FIG. 1 corresponds to a width direction of the vehicle body B (hereinafter also referred to as "vehicle width direction"), and the front-rear direction shown in FIG. 1 corresponds to a front-rear direction of the vehicle body B (hereinafter also referred to as merely "front-rear direction").

As shown in FIG. 1, the substructure C of the vehicle body B according to the present embodiment includes a side sill structure C1 and a battery pack structure C2, and has a configuration which allows transmission of a load in side collision of the vehicle to the inner side in the vehicle width direction to be made better.

Moreover, a battery pack 51 and a battery side frame 61 composing the battery pack structure C2 are disposed below a floor panel 21. In FIG. 1, the battery pack 51 and the battery side frame 61 are shown by a hidden line (dotted line) with being integral with each other, for convenience of construction.

Hereinafter, description will be first given of the side sill structure C1, and description will be then given of the battery pack structure C2.

<<Side sill structure>>

The side sill structure C1 according to the present embodiment is mainly characterized in that, in a stiffener 41 (see FIG. 2) that is disposed in a hollow part (inside a cross section) of a side sill 11, a first side surface 44a (see FIG. 2) on the inner side in the vehicle width direction is shifted to a relatively upper side than a second side surface 45a (see FIG. 2) on the outer side in the vehicle width direction.

As shown in FIG. 1, the side sill structure C1 includes the side sill 11, a dashboard lower 20, the floor panel 21, and a floor cross member 31. Note that in FIG. 1, illustration of the dashboard lower 20 is partially omitted, for convenience of construction, with an upper portion of the dashboard lower 20 being broken in the vicinity of a rear part of a front side frame 71.

Moreover, the side sill structure C1 further includes the stiffener 41 (see FIG. 2) to be described later, which is disposed inside the side sill 11. Incidentally, the side sill 11 which is a component of the side sill structure C1 is also a component of the battery pack structure C2 to be described in detail later.

<Side Sill>

The side sill 11 is a hollow member elongated in the front-rear direction which is disposed at both side parts in the vehicle width direction, respectively. A forward end of the side sill 11 is connected to the rear part of the front side frame 71 that extends in the front-rear direction at both side parts in the front part of the vehicle body B. More specifically, the forward end of each of the side sills 11 is connected to the corresponding front side frame 71 through an outrigger 72 that is connected to aside surface of each of the rear parts of the right and left front side frames 71. Incidentally, the rear part of the front side frame 71 is connected to the dashboard lower 20.

In FIG. 1, reference sign 32 denotes a fastening part for a collared bolt 59 (see FIG. 2) to be described later. Moreover, reference sign 73 denotes a front pillar that is provided integrally with a front part of the side sill 11, and reference sign 74 denotes a center pillar that is provided integrally with a central part in the front-rear direction of the side sill 11.

FIG. 2 is a sectional view of the side sill structure C1, taken along line II-II in FIG. 1.

As shown in FIG. 2, the side sill 11 includes an outer panel 12 that is disposed on the outer side in the vehicle width direction, an inner panel 13 that is disposed on the inner side in the vehicle width direction, and a supporting panel 14 that is adapted to support the stiffener 41.

The outer panel 12 includes a bulged part 15 that bulges outward in the vehicle width direction, and flanges 17a, 17b that are formed on upper and lower sides of the bulged part 15, respectively. Incidentally, an upper surface of the bulged part 15 is formed with a stepped portion which corresponds to a shape of a lower end face of a side door (not shown) to be mounted on the vehicle body B (see FIG. 1). A lower surface of the bulged part 15 forms a gentle curved surface which projects outward. Note that a side sill garnish made of resin is mounted on the outside of the lower surface of the bulged part 15, using a fastening tool such as a clip, but the side sill garnish is omitted in FIG. 2.

The inner panel 13 includes a bulged part 16 that bulges inward in the vehicle width direction, and flanges 18a, 18b that are formed on upper and lower sides of the bulged part 16, respectively. Incidentally, a side surface of the bulged part 16 forms a facing surface part 16a which faces the first side surface 44a of the stiffener 41 to be described later. Connected to the facing surface part 16a are a side edge of the floor panel 21 and a side end of the floor cross member 31. Moreover, an upper surface of the bulged part 16 forms a facing surface part 16b which is spaced by a predetermined distance from a first upper surface 44b of the stiffener 41 to be described later.

A lower surface of the bulged part 16 is formed with a supporting part 16c for the battery side frame 61 which is a component of the battery pack structure C2 to be described later. Attachment of the battery side frame 61 to the supporting part 16c in the present embodiment assumes fastening which is realized by screwing a bolt 40a inserted through an opening M of the battery side frame 61, into the fastening part 32 formed of a plate nut provided on the supporting part 16c.

The lower surface of the bulged part 16 in the present embodiment forms a horizontal plane.

Note that the "horizontal plane" herein assumes a virtual plane parallel to a horizontal ground when the vehicle body B (see FIG. 1) is placed on the horizontal ground. When structural members of the vehicle body B are considered as a criterion, the virtual plane is identical to a horizontal plane in which, for example, a base plane of the floor panel 21 is disposed.

The supporting panel 14 is a member that supports the stiffener 41 disposed in the side sill 11 as described above. The supporting panel 14 is formed of a plate body that partitions the hollow part of the side sill 11 into inner and outer parts in the vehicle width direction.

The supporting panel 14 is inclined to gradually come near the outer side in the vehicle width direction as it comes toward the lower side within the hollow part of the side sill 11, because an outer stiffener 42 to be described later allows a lower flange 42c thereof to be displaced to the more outer side in the vehicle width direction than an upper flange 42b thereof.

The side sill 11 is formed into one body by connecting together so as to sandwich upper and lower parts of the supporting panel 14 between the flanges 17a, 17b of the outer panel 12 and the flanges 18a, 18b of the inner panel 13, respectively. This allows the inside of the side sill 11 to form the configuration in which the hollow part of a closed cross section is partitioned by the supporting panel 14 as described above.

Note that the outer panel 12, the inner panel 13 and the supporting panel 14 in the present embodiment assumes what is formed of a so-called high strength steel plate, e.g., having a tensile strength of 270 MPa or more.

<Dashboard Lower>

As shown in FIG. 1, the dashboard lower 20 changes to the floor panel 21 through a first floor cross member 31a to be described later, as a boundary, to define a floor surface of the front part in a vehicle cabin. Moreover, the dashboard lower 20 extends toward the oblique front and upper side of the vehicle body so as to form a vertical wall that partitions between the vehicle cabin side and a power unit chamber side.

Incidentally, the dashboard lower 20 in the present embodiment is provided with a cross member (not shown) extending in the vehicle width direction at the rear side of the vertical wall. Moreover, the dashboard lower 20 reinforced by the cross member can have a mounting member (not shown) disposed on a lower surface thereof, which fastens the rear parts of the side frames thereto.

<Floor Panel>

As shown in FIG. 1, the floor panel 21 is composed of a press-molded plate body so as to correspond to a bulged structure formed on an upper surface of the battery pack 51 (see FIG. 10) to be described later. The floor panel 21 is disposed between the right and left side sills 11, 11.

As shown in FIG. 2, the side edge of the floor panel 21 is joined to the facing surface part 16a of the inner panel 13 composing the side sill 11 as described above. More specifically, a flange 21a formed at the side edge of the floor panel 21 is connected to the inner panel 13 by welding or the like. Note that in FIG. 2, the flange 21a of the floor panel 21 is shown in the form of an end face indicated by a solid line in the hollow floor cross member 31 to be described later.

Moreover, although not illustrated, a configuration can also be adopted such that the side edge of the floor panel 21 is joined to the side sill 11 through a belt-shaped plate body which is a separate member extending in the front-rear direction (vertical direction in FIG. 2, as viewed from the paper).

The floor panel 21 is formed with insertion holes (not shown) each for the collared bolt 59 to be described in detail later. Incidentally, the collared bolt 59 is used in mounting the battery pack 51 to be described later on the floor cross member 31. The insertion hole (not shown) is formed at a position corresponding to the fastening part 32 of the floor cross member 31, into which the bolt 40a composing the collared bolt 59 is screwed. Note that in FIG. 2, reference sign 30 denotes a grommet. The grommet 30 in the present embodiment assumes what is made of elastic synthetic resin. The grommet 30 is adapted to ensure a space of predetermined interval between the battery pack 51 and the floor cross member 31. The grommet 30 can give watertightness to the fastening part 32.

Note that, as for the collared bolt 59, the collar and the bolt may be separate members, and a stud bolt may be used.

The floor panel 21 in the present embodiment assumes what is formed of a steel plate having a lower strength than the outer panel 12 and the inner panel 13. Moreover, the belt-shaped plate body (not shown) described above assumes what is formed of the same steel material as that of the floor panel 21, or an aluminum alloy material. Note that the materials of the floor panel 21 and the belt-shaped plate body are not limited to these examples.

<Floor Cross Member>

As shown in FIG. 1, the floor cross member 31 is disposed to extend in the vehicle width direction between the right and left side sills 11 (the stiffeners 41 (see FIG. 2) to be described later). The floor cross member 31 in the present embodiment is composed of the first floor cross member 31a that extends in the vehicle width direction between the dashboard lower 20 and the floor panel 21, and a second floor cross member 31b that extends along a lower surface of the floor panel 21 at the rear side of the first floor cross member 31a. Note that the second floor cross member 31b is shown by a hidden line (dotted line) in FIG. 1.

In the following description, when the first floor cross member 31a and the second floor cross member 31b need not be distinguished from each other, they are merely referred to as the floor cross member 31.

The first floor cross member 31a and the second floor cross member 31b are formed with four fastening parts 32 described above, respectively. The fastening part 32 is formed of a female screw with which the collared bolt 59 is engaged. Note that the fastening part 32 is formed of a plate nut and shown by a hidden line (dotted line) in FIG. 1.

Figure 3A:
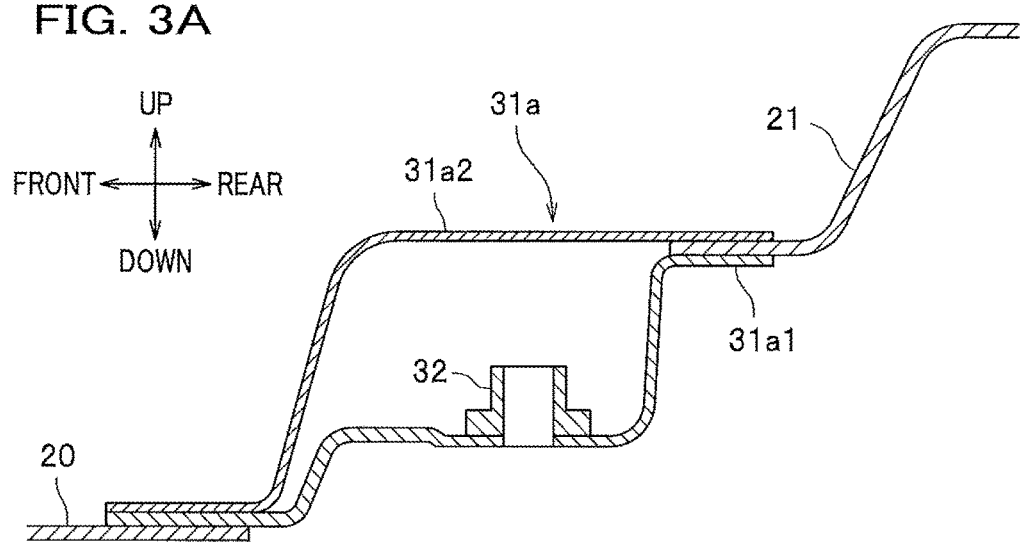
FIG. 3A is a sectional view of a first floor cross member, taken along line IIIa-IIIa in FIG. 1.
Figure 3B:
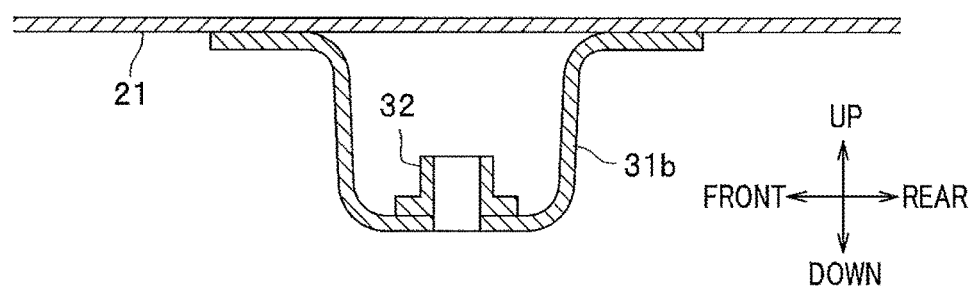
FIG. 3B is a sectional view of a second floor cross member, taken along line IIIb-IIIb in FIG. 1.

FIG. 3A is a sectional view of the first floor cross member 31a, taken along line IIIa-IIIa in FIG. 1, and FIG. 3B is a sectional view of the second floor cross member 31b, taken along line IIIb-IIIb in FIG. 1.

As shown in FIG. 3A, the first floor cross member 31a is disposed to connect a front edge of the floor panel 21 with a rear edge of the dashboard lower 20.

The first floor cross member 31a is formed by a lower half 31a1 having a plate nut forming the fastening part 32, and an upper half 31a2 adapted to cover the lower half 31a1 on the upper side.

The lower half 31a1 in the present embodiment is formed in a stepwise shape so as to fill a difference in height between the rear edge of the dashboard lower 20 and the front edge of the floor panel 21. Further, a lower surface of a front edge of the lower half 31a1 and an upper surface of the rear edge of the dashboard lower 20 are joined together, and an upper surface of a rear edge of the lower half 31a1 and a lower surface of the front edge of the floor panel 21 are joined together.

The upper half 31a2 in the present embodiment is formed of a bent plate body having the form of nearly L shape in section view. Further, a front edge of the upper half 31a2 is joined through the lower half 31a1 to the dashboard lower 20, and a rear edge of the upper half 31a2 is joined through the floor panel 21 to the lower half 31a1. This allows the first floor cross member 31a to form a closed cross section between the lower half 31a1 and the upper half 31a2.

As shown in FIG. 3B, the second floor cross member 31b is configured to have a plate nut forming the fastening part 32 within a central bulged part having the shape of a hat in section view. Further, the second floor cross member 31b is joined to the lower surface of the floor panel 21 through the part corresponding to a flange of the hat shape. This allows a closed cross section to be formed between the second floor cross member 31b and the floor panel 21.

Note that in FIG. 3A and FIG. 3B, the collared bolt 59 (see FIG. 2) is fastened to the fastening part 32.

The first floor cross member 31a and the second floor cross member 31b thus configured are connected through flanges (not shown) formed at both right and left ends thereof, respectively, to the inner panels 13 (see FIG. 2) of the side sills 11 (see FIG. 2) as described above. This allows respective both right and left ends of the first floor cross member 31a and the second floor cross member 31b to abut on the facing surface parts 16a of the inner panels 13 composing the side sills 11.

<Stiffener>

As shown in FIG. 2, the stiffener 41 is disposed in the hollow part of the side sill 11.

The stiffener 41 in the present embodiment includes the outer stiffener 42 that is disposed on the outer side in the vehicle width direction, and an inner stiffener 43 that is disposed on the inner side in the vehicle width direction.

The outer stiffener 42 has a nearly hat-shaped cross section bulging outward in the vehicle width direction. More specifically, the outer stiffener 42 includes a bulged part 42a that forms a nearly trapezoid projecting outward in the vehicle width direction in section view. The outer stiffener 42, inclusive of the upper flange 42b and the lower flange 42c which are provided at upper and lower ends of the nearly trapezoid, respectively, forms the nearly hat-shaped cross section.

Moreover, the nearly trapezoid of the bulged part 42a of the outer stiffener 42 is preferably a trapezoid having opening legs, more preferably a trapezoid having opening legs in which each of the legs opens at a nearly equal angle to a horizontal plane S as shown in FIG. 2.

The inner stiffener 43 has a nearly hat-shaped cross section bulging inward in the vehicle width direction. More specifically, the inner stiffener 43 includes a bulged part 43a that forms a nearly trapezoid projecting inward in the vehicle width direction in section view. The inner outer stiffener 43, inclusive of an upper flange 43b and a lower flange 43c which are provided at upper and lower ends of the nearly trapezoid, respectively, forms the nearly hat-shaped cross section.

The stiffener 41 in the present embodiment allows the upper flange 42b of the outer stiffener 42 and the upper flange 43b of the inner stiffener 43 to be joined through the supporting panel 14 to each other. Moreover, the lower flange 42c of the outer stiffener 42 and the lower flange 43c of the inner stiffener 43 are joined through the supporting panel 14 to each other.

This allows the outer stiffener 42 and the inner stiffener 43 to be formed into one body, thereby allowing the stiffener 41 to form a structure having a nearly hexagonal closed cross section.

In the stiffener 41 in the present embodiment, the inner stiffener 43 has the first side surface 44a formed on the inner side in the vehicle width direction. Further, in the stiffener 41, the inner stiffener 43 has a first upper surface 44b and a first lower surface 44c that are formed to hold the first side surface 44a from the upper and lower sides and correspond to the legs of the nearly trapezoidal cross section.

Moreover, in the stiffener 41 in the present embodiment, the outer stiffener 42 has the second side surface 45a formed on the outer side in the vehicle width direction. Further, in the stiffener 41, the outer stiffener 42 has a second upper surface 45b and a second lower surface 45c that are formed to hold the second side surface 45a from the upper and lower sides and correspond to the legs of the nearly trapezoidal cross section.

In the stiffener 41 thus configured, the first side surface 44a and the second side surface 45a are disposed to oppose each other and preferably to nearly parallel each other.

Moreover, the first side surface 44a is shifted to a relatively upper side than the second side surface 45a as described above. Herein, the "shifted to a relatively upper side" means to allow not only a preferable state in which the whole in the vertical direction of the first side surface 44a is located at the upper side than the second side surface 45a, but also a state in which at least a part of the whole in the vertical direction of the first side surface 44a is located at the upper side than the second side surface 45a.

The first upper surface 44b of the stiffener 41 is preferably formed along the horizontal plane.

The first lower surface 44c of the stiffener 41 is inclined to extend from a lower joining area between the inner stiffener 43 and the outer stiffener 42 toward a joining area between the side sill 11 and the floor panel 21.

Moreover, in the present embodiment, an angle $\theta1$ which the first lower surface 44c of the stiffener 41 forms with the horizontal plane on a narrow angle side thereof, is greater than an angle $\theta2$ which the second lower surface 45c of the stiffener 41 forms with the horizontal plane on a narrow angle side thereof ($\theta1 > \theta2$).

Moreover, the outer stiffener 42 in the present embodiment assumes the configuration in which the second upper surface 45b and the second lower surface 45c corresponding to the legs of the nearly trapezoid as described above open at the nearly equal angle to the horizontal plane S, respectively. The outer stiffener 42 also assumes the configuration in which the second upper surface 45b is bent or curved in a central part thereof so as to slightly project upward, and the second lower surface 45c is bent or curved in a central part thereof so as to slightly project downward.

Figure 4:
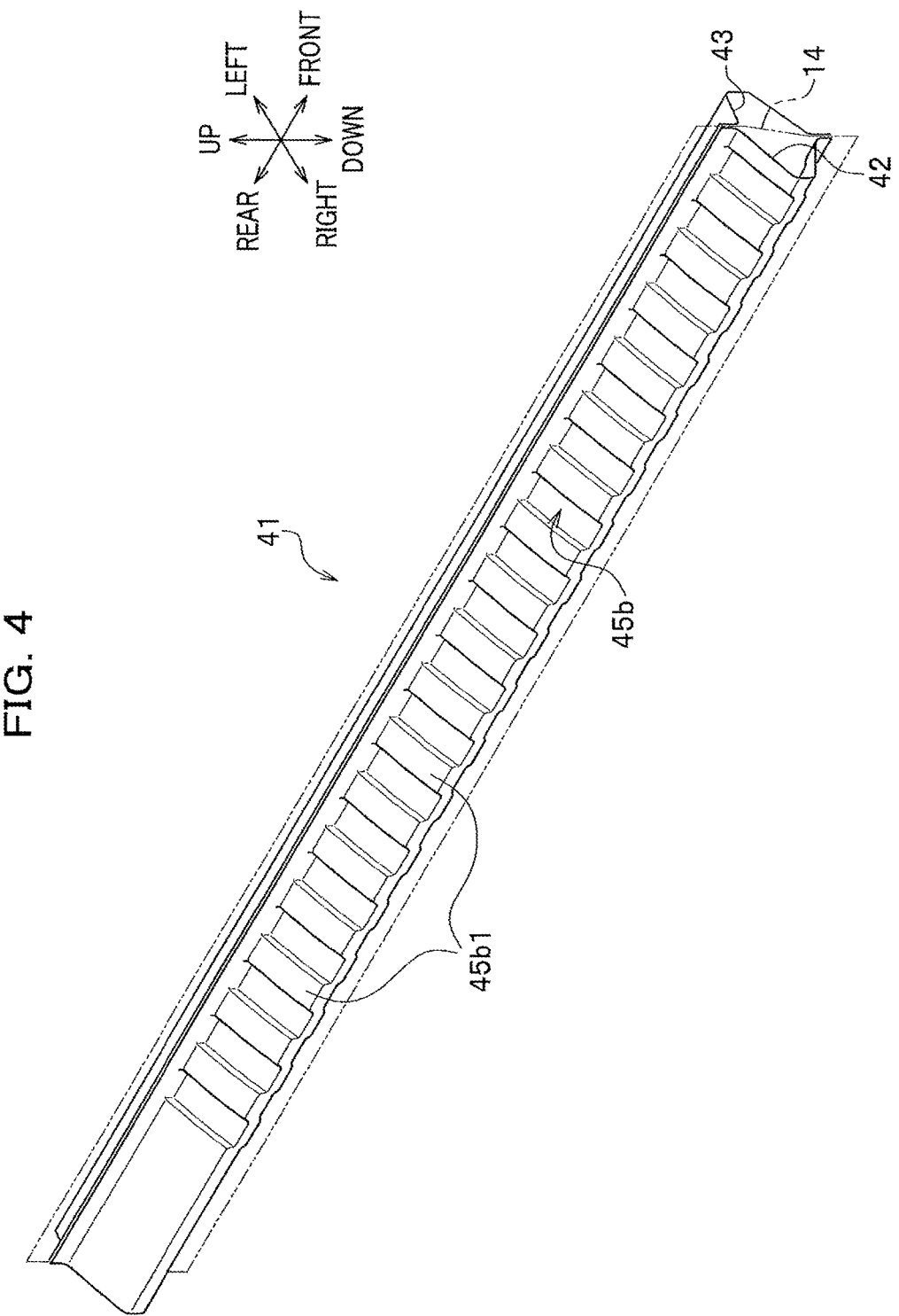
FIG. 4 is a partial perspective view showing a state in which a stiffener disposed in a side sill on the left side of the vehicle body is looked down from a left oblique front and upper side of the vehicle body.

FIG. 4 is a partial perspective view showing a state in which the stiffener 41 disposed in the side sill 11 (see FIG. 1) on the left side of the vehicle body B (see FIG. 1) is looked down from the left oblique front and upper side of the vehicle body B (see FIG. 1). Note that in FIG. 4, the outer panel 12 (see FIG. 2) and the inner panel 13 (see FIG. 2) of the side sill 11 (see FIG. 2) are omitted. Moreover, in FIG. 4, the supporting panel 14 of the side sill 11 (see FIG. 2) is shown by a virtual line (two-dot chain line).

As shown in FIG. 4, the outer stiffener 42 has a plurality of beads 45b1 on the second upper surface 45b.

These beads 45b1 extend in a direction crossing the extending direction of the stiffener 41 and are lined up in the extending direction of the stiffener 41. Incidentally, the beads 45b1 in the present embodiment extend on the second upper surface 45b in a direction perpendicular to the extending direction of the stiffener 41.

These beads 45b1 may be formed only on the second upper surface 45b, or may be formed on both of the second upper surface 45b and the second lower surface 45c, or only on the second lower surface 45c.

Incidentally, the present embodiment assume that the beads 45b1 are formed on both of the second upper surface 45b and the second lower surface 45c.

Note that, when the beads 45b1 are formed on both of the second upper surface 45b and the second lower surface 45c, it is preferable that the beads 45b1 on the second upper surface 45b and the beads 45b1 on the second lower surface 45c are formed to be alternately aligned with each other.

Moreover, although the beads 45*b*1 in the present embodiment are formed by corrugating a plate body forming the outer stiffener 42, ridge-shaped projections only need to be formed on the surface of the outer stiffener 42, and methods of forming the beads 45*b*1 are especially not limited.

Note that in FIG. 4, reference sign 43 denotes the inner stiffener.

Figure 5:
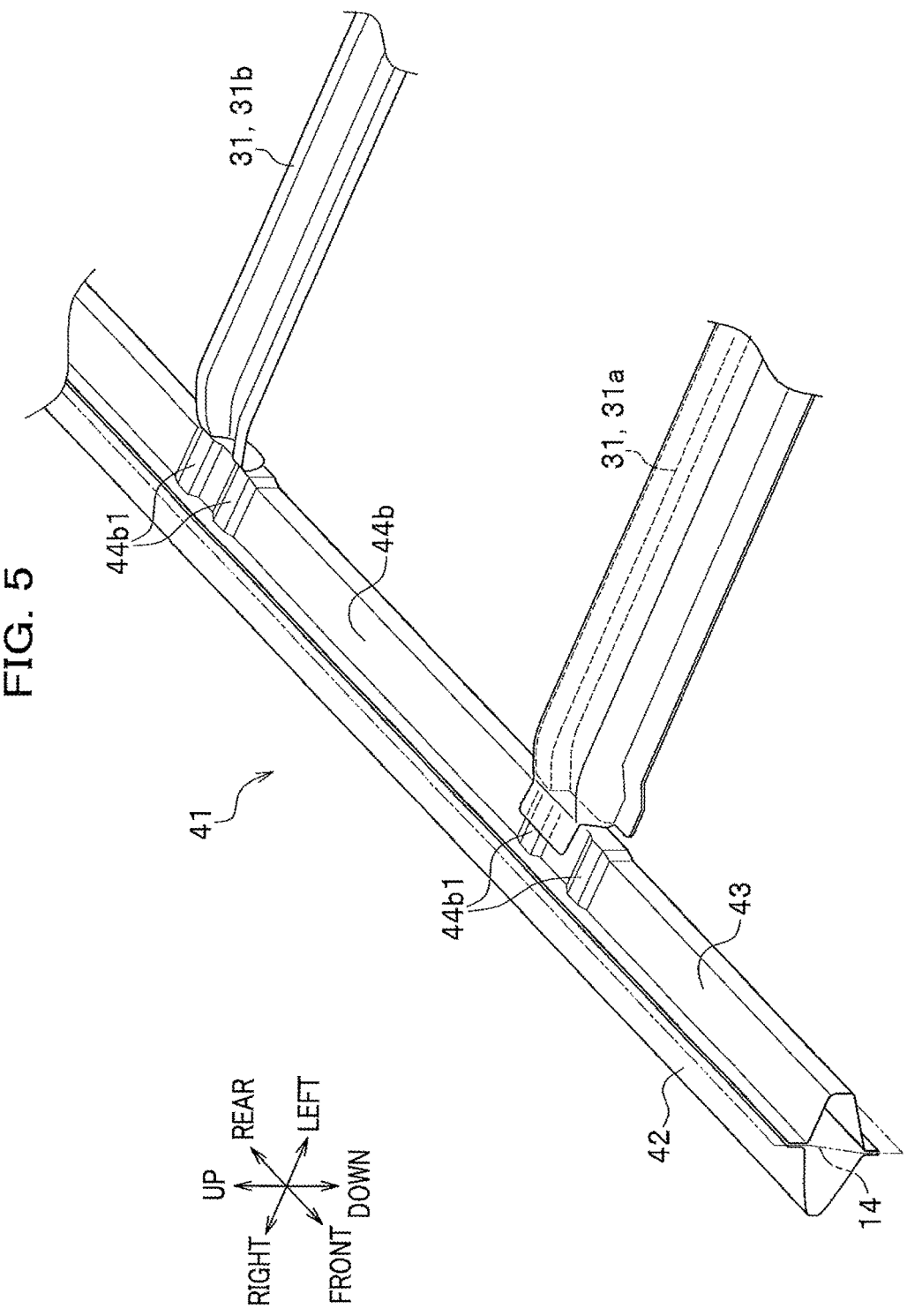
FIG. 5 is a partial perspective view showing a state in which the stiffener disposed in the side sill on the left side of the vehicle body is looked down from a right oblique front and upper side of the vehicle body, together with a positional relation to the floor cross members.

FIG. 5 is a partial perspective view showing a state in which the stiffener 41 disposed in the side sill 11 (see FIG. 2) on the left side of the vehicle body B (see FIG. 1) is looked down from the right oblique front and upper side of the vehicle body B, together with the positional relation to the floor cross members 31. Note that in FIG. 5, the outer panel 12 (see FIG. 2) and the inner panel 13 (see FIG. 2) of the side sill 11 (see FIG. 2), and the beads 45*b*1 (see FIG. 4) of the outer stiffener 42 are omitted. Moreover, in FIG. 4, the supporting panel 14 of the side sill 11 (see FIG. 2) is shown by a virtual line (two-dot chain line).

As shown in FIG. 5, the inner stiffener 43 has beads 44*b*1 that are formed at positions on the first upper surface 44*b*, corresponding to each end in the extending direction of the first and second floor cross members 31*a*, 31*b*, and which extend in a direction crossing the extending direction of the stiffener 41.

These beads 44*b*1 extend along the extending direction of the first and second floor cross members 31*a*, 31*b*. The beads 44*b*1 in the present embodiment extend in a direction perpendicular to the extending direction of the stiffener 41.

Moreover, the beads 44*b*1 are formed in a plurality of rows for each of the first and second floor cross members 31*a*, 31*b*. The beads 44*b*1 in the present embodiment are formed in two rows for each of the first and second floor cross members 31*a*, 31*b*, at positions corresponding to both edges in the front-rear direction of each of the floor cross members 31*a*, 31*b*.

Moreover, no bead 44*b*1 is formed on the first upper surface 44*b* of the inner stiffener 43, which is located between the first and second floor cross members 31*a*, 31*b*.

Note that in FIG. 5, reference sign 42 denotes the outer stiffener.

Next, description will be given of operation and effects produced by the side sill structure C1.

The side sill structure C1 according to the present embodiment allows the first side surface 44*a* of the stiffener 41 to be shifted to a relatively upper side than the second side surface 45*a*.

The side sill structure C1 thus configured makes it possible, in side collision of the vehicle, to allow transmission of a collision load through the side sill 11 to the floor cross members 31 to be made better.

Moreover, in the side sill structure C1 according to the present embodiment, the battery pack 51 is supported through the battery side frame 61 on the lower surface of the side sill 11 (inner panel 13).

The side sill structure C1 thus configured prevents the inner stiffener 43 from being an obstacle to the supporting point of the battery pack 51, thus making it possible to improve freedom in layout for supporting the battery pack 51.

Moreover, in the side sill structure C1 according to the present embodiment, the outer stiffener 42 has a cross-sectional shape of a nearly isosceles trapezoid, and the second upper surface 45*b* and the second lower surface 45*c* corresponding to the legs of the nearly isosceles trapezoid are slightly bent or curved outward.

FIGS. 6A to 6C to be next referred to are schematic diagrams each showing a state in which the outer stiffener 42 in the present embodiment is deformed in side collision, and FIGS. 6D to 6F and FIGS. 6G to 6I are reference diagrams which are compared with FIGS. 6A to 6C.

When an object Ob comes into side collision with the outer stiffener 42 in the present embodiment shown in FIG. 6A, the outer stiffener 42 is deformed so as to allow bent parts or curved parts in the legs of the nearly isosceles trapezoid to project outward as shown in FIG. 6B. Thereafter, as shown in FIG. 6C, the legs of the nearly isosceles trapezoid form erecting leg parts nearly vertically to the supporting panel 14 of the side sill 11. This causes the outer stiffener 42 to efficiently transmit a load in side collision to the inner side in the vehicle width direction.

In contrast, the outer stiffener 42 shown in FIG. 6D as a reference example allows only one of two legs of a nearly trapezoid to form an erecting leg part nearly vertically to the supporting panel 14 of the side sill 11. When a load in side collision is transmitted to the outer stiffener 42 thus configured, the outer stiffener 42 is bent on the nearly vertical leg part side thereof as shown in FIG. 6E. This causes the outer stiffener 42 to collapse on the surface of the supporting panel 14 as shown in FIG. 6F. That is, there are cases when the outer stiffener 42 allows transmission of the load to the inner side in the vehicle width direction to be made insufficient.

Moreover, the outer stiffener 42 shown in FIG. 6G as another reference example allows two legs of a nearly isosceles trapezoid to become flat without being bent or curved. When a load in side collision is transmitted to the outer stiffener 42 thus configured, the legs are bent to a direction in which the cross section of the outer stiffener 42 is reduced as shown in FIG. 6H. This causes the outer stiffener 42 to buckle on the surface of the supporting panel 14 as shown in FIG. 6I. Therefore, there are cases when the outer stiffener 42 allows transmission of the load to the inner side in the vehicle width direction to be made insufficient.

Thus, the outer stiffener 42 of the nearly isosceles trapezoid in the present embodiment (see FIG. 6A) allows transmission of the load in side collision to be made better, as compared to the outer stiffeners 42 in the reference examples (see FIG. 6D and FIG. 6G).

Moreover, in the side sill structure C1 according to the present embodiment, the angle θ1 which the first lower surface 44*c* of the stiffener 41 (the lower surface of the inner stiffener 43) forms with the horizontal plane on the narrow angle side thereof, is set to be greater than the angle θ2 which the second lower surface 45*c* of the stiffener 41 (the lower surface of the outer stiffener 42) forms with the horizontal plane on the narrow angle side thereof.

The side sill structure C1 thus configured allows an inclined angle of the lower surface of the inner stiffener 43 to become acute, thus making it possible to allow transmission of a collision load through the side sill 11 to the floor cross members 31 to be made better.

Moreover, in the side sill structure C1 according to the present embodiment, the beads 45*b*1 extending along the vehicle width direction are formed on at least one surface of the second upper surface 45*b* of the stiffener 41 (the upper surface of the outer stiffener 42) and the second lower surface 45*c* of the stiffener 41 (the lower surface of the outer stiffener 42).

The side sill structure C1 thus configured makes it possible to cause the beads 45*b*1 to allow transmission of a collision load through the side sill 11 to the floor cross members 31 to be made better.

Moreover, in the side sill structure C1 according to the present embodiment, the inner stiffener 43 has the beads 44*b*1 that are provided at the positions corresponding to each end in the extending direction of the floor cross member 31 and extend along the vehicle width direction.

The side sill structure C1 thus configured makes it possible to cause the beads 44b1 to allow transmission of a collision load through the side sill 11 to the floor cross members 31 to be made better.

Moreover, in the side sill structure C1 according to the present embodiment, the beads 44b1 of the inner stiffener 43 are formed in two rows only at the positions corresponding to each end in the extending direction of the first and second floor cross members 31a, 31b. On the other hand, no bead 44b1 is formed on the part of the inner stiffener 43 which is located between the first and second floor cross members 31a, 31b.

The side sill structure C1 thus configured makes it possible, in side collision of the vehicle, to reduce the amount of intrusion toward the inner side in the vehicle width direction, as described below.

FIGS. 7A and 7B are schematic diagrams showing a state of deformation of the stiffener 41 encountered when a load in side collision is input via the object Ob to the stiffener 41 having the outer stiffener 42 and the inner stiffener 43, the outer stiffener 42 having the beads 45b1, and the inner stiffener 43 not having the beads 44b1.

Figure 8A:
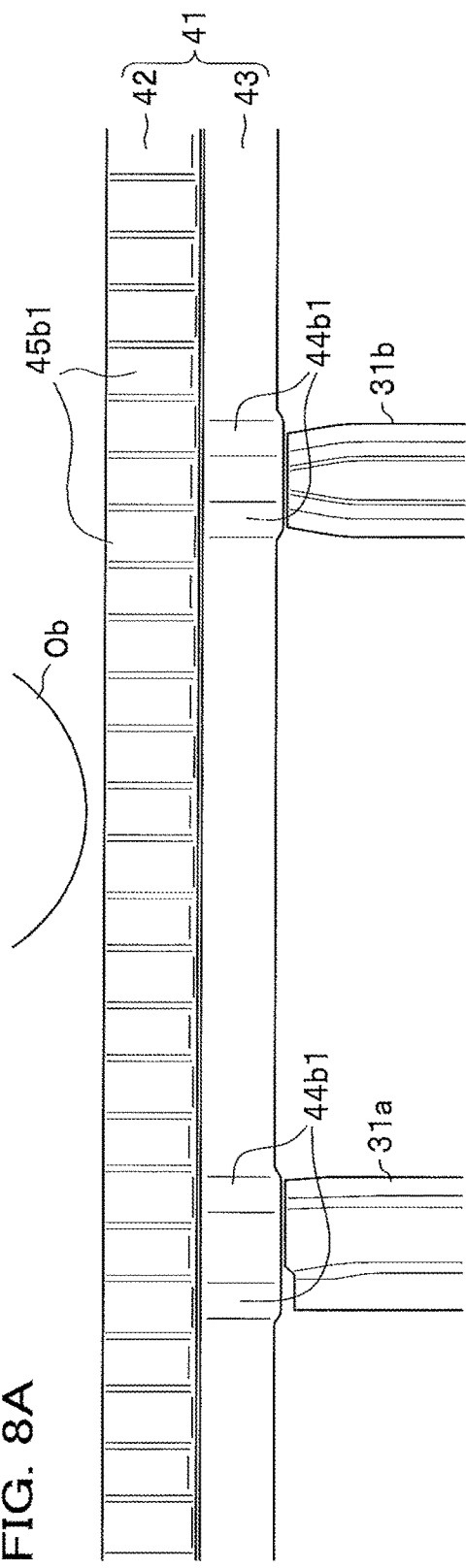
FIGS. 8A and 8B are schematic diagrams showing a state of deformation of the stiffener encountered when a load in side collision is input via an object to the stiffener having an outer stiffener and an inner stiffener, the outer stiffener having beads, and the inner stiffener partially having beads.
Figure 8B:
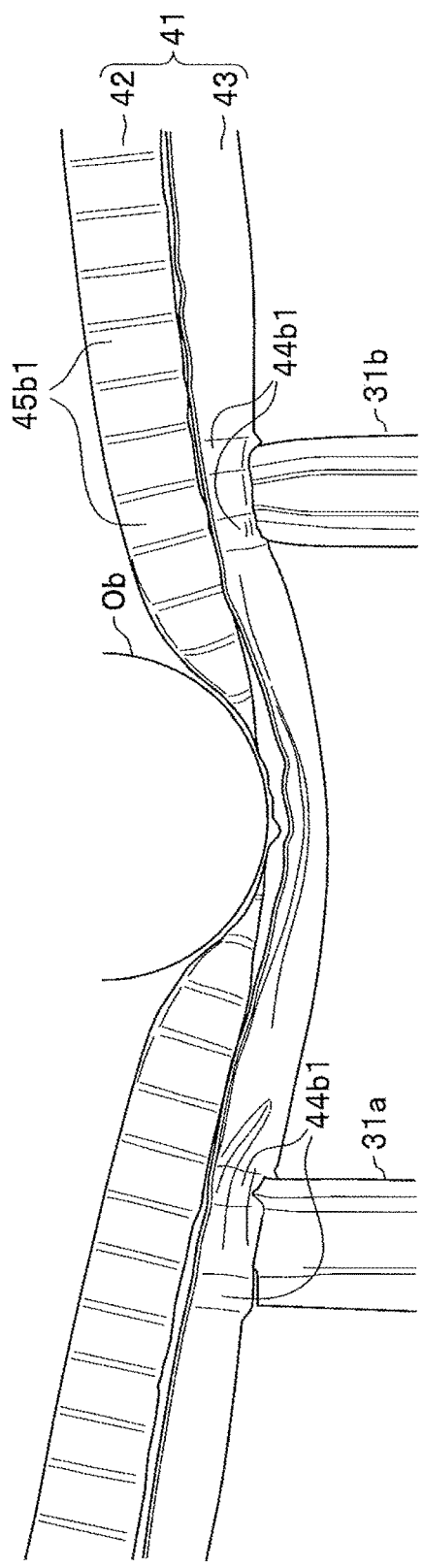

FIGS. 8A and 8B are schematic diagrams showing a state of deformation of the stiffener 41 encountered when a load in side collision is input via the object Ob to the stiffener 41 having the outer stiffener 42 and the inner stiffener 43, the outer stiffener 42 having the beads 45b1, and the inner stiffener 43 partially having the beads 44b1.

As shown in FIGS. 7A and 7B, when the load in side collision is input to the stiffener 41 from the object Ob, collapse of the stiffener 41 develops in the part between the first floor cross member 31a and the second floor cross member 31b. On this occasion, the beads 45b1 of the outer stiffener 42 make it possible to enhance a load under which the outer stiffener 42 crushes in the side collision. This enables an absorption efficiency of collision energy to be increased.

As shown in FIGS. 8A and 8B, when the load in side collision is input to the stiffener 41 from the object Ob, collapse of the stiffener 41 develops in the part between the first floor cross member 31a and the second floor cross member 31b because the inner stiffener 43 has no bead 44b1 on the part located between the floor cross members 31a, 31b.

While on the other hand, the beads 44b1 are formed on the inner stiffener 43, at the parts corresponding to each end of the first floor cross member 31a and the second floor cross member 31b. This allows crushing due to the input load to be suppressed in the parts of the inner stiffener 43 including the beads 44b1, thereby allowing the collision load to be efficiently transmitted to the first floor cross member 31a and the second floor cross member 31b.

That is, the stiffener 41 shown in FIG. 8A makes it possible, firstly, to transmit the load in side collision through the side sill 11 (see FIG. 1) to the first floor cross member 31a and the second floor cross member 31b. The stiffener 41 also makes it possible, secondly, to crush the side sill 11 (stiffener 41) to reduce the amount of intrusion into the battery pack 51. That is, the stiffener 41 makes it possible to achieve both the first characteristics and the second characteristics in side collision that are contrary to each other.

<<Battery Pack Structure>>

Next, description will be given of the battery pack structure C2 (see FIG. 1) in the present embodiment.

The battery pack structure C2 is mainly characterized in that a lower surface 61c (see FIG. 13) of the battery side frame 61 (see FIG. 13), located on the outer side in the vehicle width direction, is located at a lower side than a supporting part 61b (see FIG. 13) for the battery pack 51 (see FIG. 13) in the battery side frame 61, formed on the inner side in the vehicle width direction.

Figure 9:
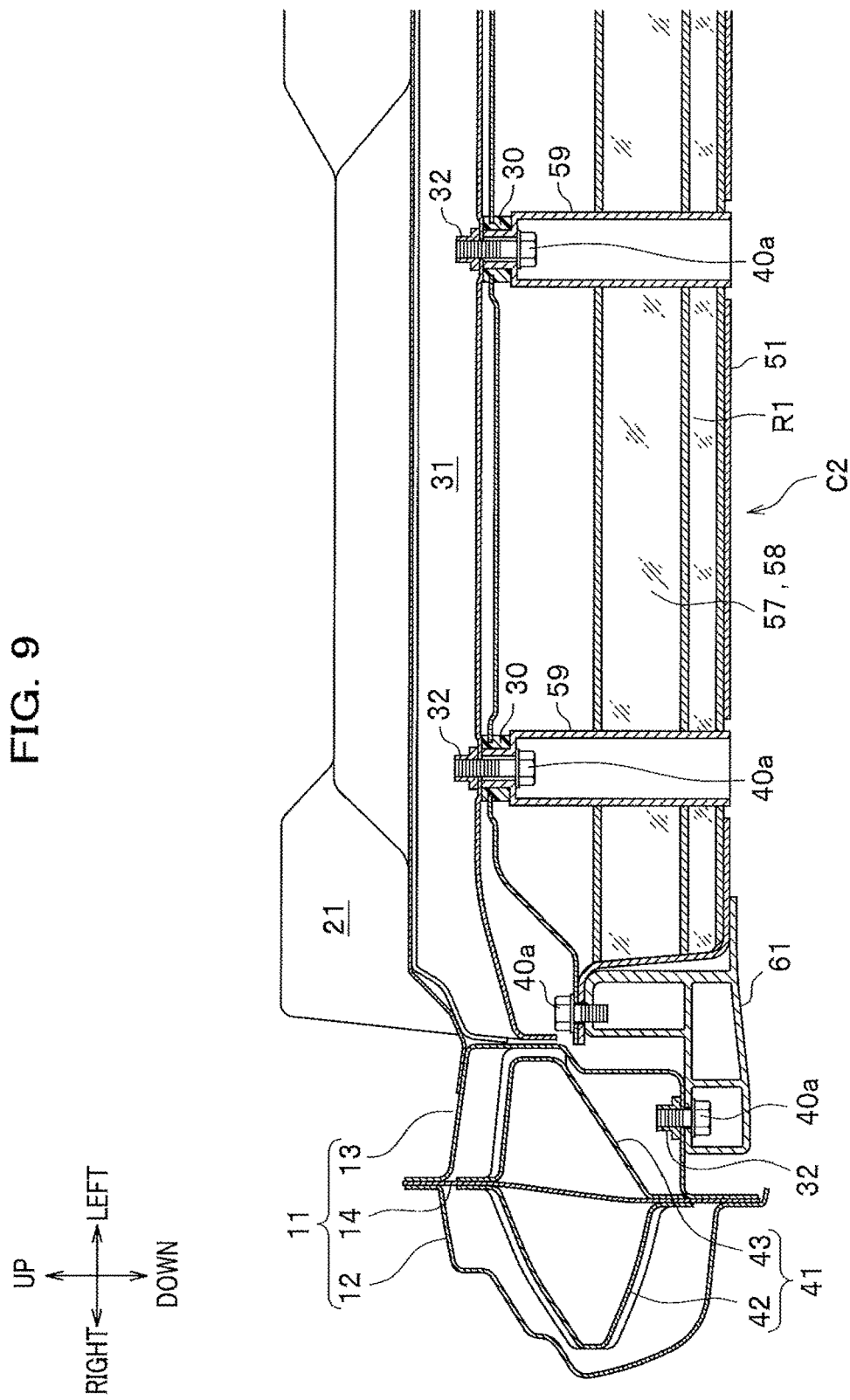
FIG. 9 is a partial sectional view of a battery pack structure, taken along line IX-IX in FIG. 1.

FIG. 9 is a partial sectional view of the battery pack structure C2, taken along line IX-IX in FIG. 1.

As shown in FIG. 9, the battery pack structure C2 includes the side sill 11 described above, the battery pack 51, and the battery side frame 61.

As described above, the battery pack 51 is disposed below the floor panel 21 and fastened by the collared bolt 59 to the floor cross member 31 that extends in the vehicle width direction on the floor panel 21. Further, as described above, the grommet 30 forms the space of predetermined interval between the battery pack 51 and the floor cross member 31.

Moreover, the battery pack 51 is fastened by the bolt 40a to the battery side frame 61. Further, the battery side frame 61 and the side sill 11 are joined to each other through the bolt 40a and the fastening part 32 composed of a plate nut.

Note that in FIG. 9, reference sign 12 denotes the outer panel; reference sign 13 denotes the inner panel; reference sign 14 denotes the supporting panel; and reference sign 41 denotes the stiffener that is composed of the outer stiffener 42 and the inner stiffener 43.

Moreover, reference sign 58 denotes a battery cross member of a battery frame 57 that composes the battery pack 51, and reference sign R1 denotes a rib of the battery cross member 58 to be described later.

Hereinafter, the battery pack 51 and the battery side frame 61 will be described in more detail.

<Battery Pack>

Figure 10:
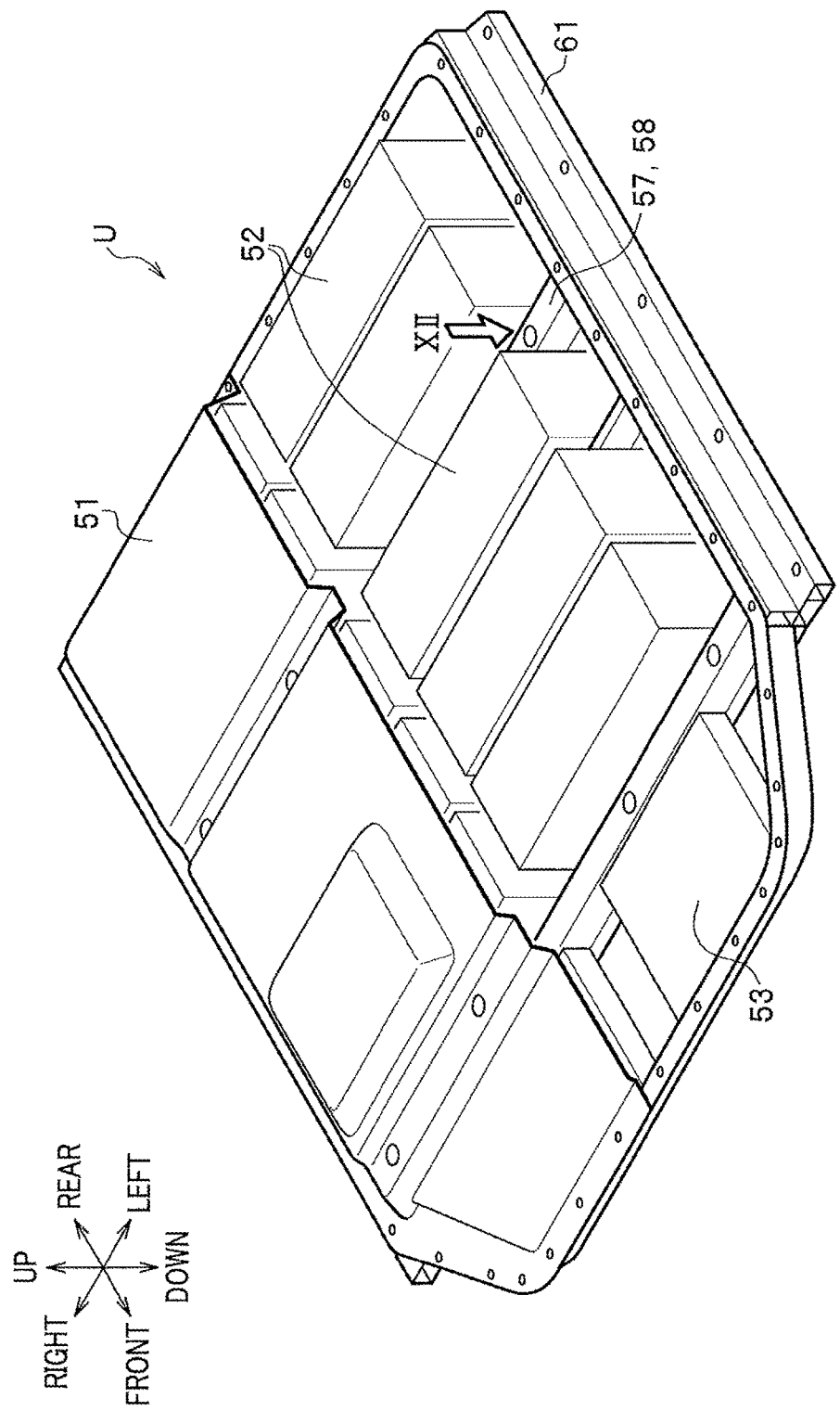
FIG. 10 is a perspective view of a battery pack unit in which a battery side frame is attached to a battery pack, and is a view showing an internal structure of the battery pack with an upper side of the battery pack being partially cut out.

FIG. 10 is a perspective view of a battery pack unit U in which the battery side frame 61 is attached to the battery pack 51, and is a view showing an internal structure of the battery pack 51 with an upper side of the battery pack 51 being partially cut out.

As shown in FIG. 10, the battery pack 51 has the shape of a nearly rectangular parallelepiped which is thin in the up-down direction.

The battery pack 51 houses therein a plurality of battery modules 52 that are arranged to be lined up in the front-rear and right-left directions. The battery modules 52 are each composed of, e.g., a lithium-ion secondary battery. Moreover, arranged in the battery pack 51 are electrical supplementary device components groups 53 each including, e.g., a junction board, a DC-DC converter and the like. Furthermore, although not illustrated, arranged in the battery pack 51 is a cooling device including air blowing mechanism, or the like.

The battery modules 52, the electrical supplementary device components groups 53, and the cooling device are supported in the battery pack 51 through the battery frame 57 which will be described in detail later.

In FIG. 10, reference sign 58 denotes the battery cross member composing the battery frame 57.

Figure 11:
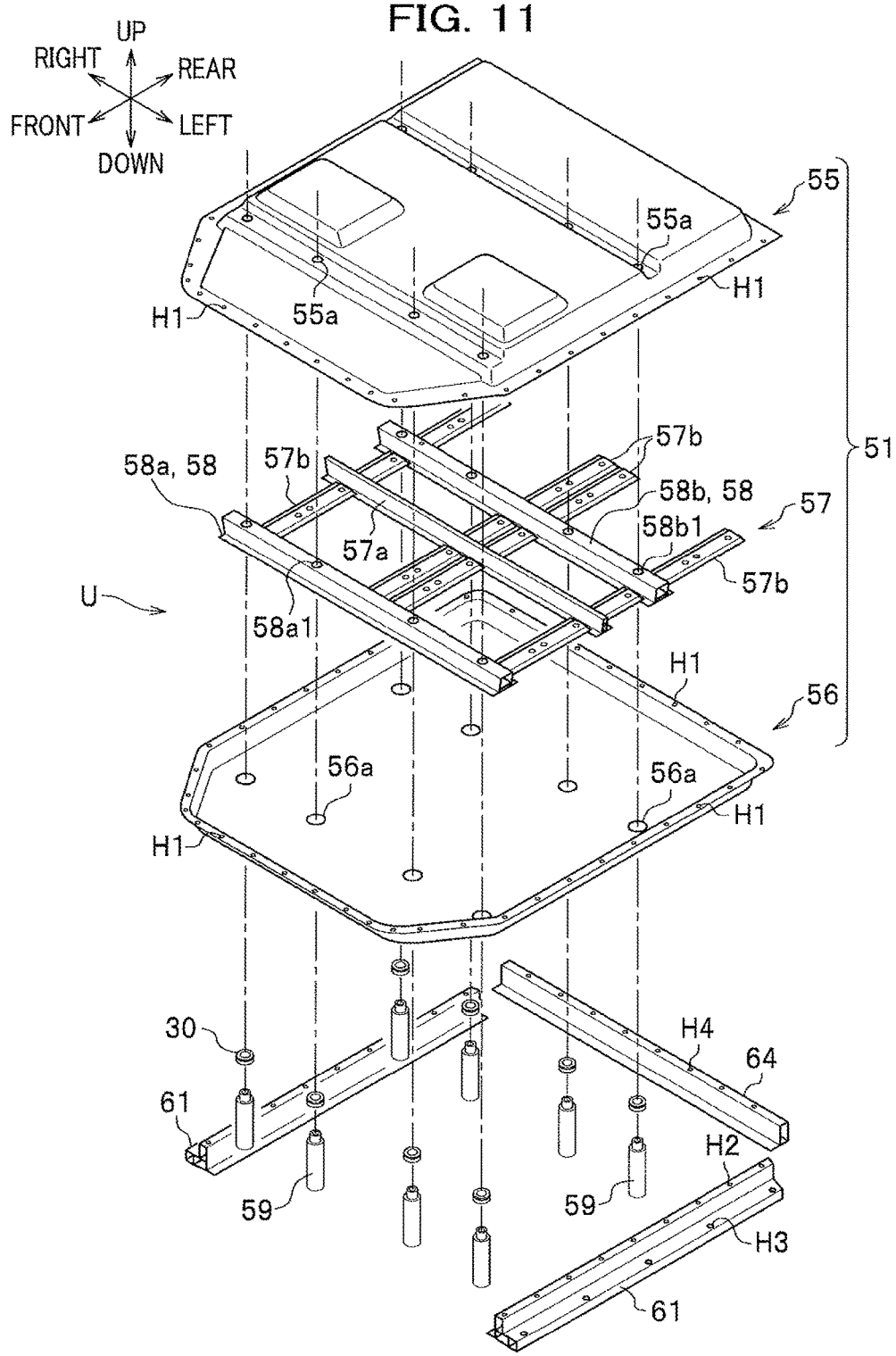
FIG. 11 is an exploded perspective view of the battery pack unit in FIG. 10.

FIG. 11 is an exploded perspective view of the battery pack unit U in FIG. 10.

As shown in FIG. 11, the battery pack 51 includes a battery cover 55, a battery tray 56, and the battery frame 57. Moreover, although illustration is omitted in FIG. 11, the battery pack 51 includes the battery modules 52, the electrical supplementary device components group 53, and the cooling device described above.

The battery cover 55 forms a shape of an upper half of the battery pack 51. The battery cover 55 in the present embodiment is formed of a press-molded plate body. The battery cover 55 has a bulged structure in which the plate body is partially bulged so as to correspond to a shape of an upper surface of each structure, such as the battery modules 52 (see FIG. 10) and the like described above, arranged in the battery pack 51.

Moreover, the battery cover 55 is formed with a plurality of insertion holes 55a through each of which the collared bolt 59 is inserted. The grommet 30 is disposed in each of the insertion holes 55a. This allows the battery cover 55 and the floor cross member 31 to be separated with a predetermined distance from each other as described above.

The insertion holes 55a are provided at positions which correspond to the fastening parts 32 (see FIG. 1) formed in the first floor cross member 31a (see FIG. 1) and the second floor cross member 31b (see FIG. 1).

The battery tray 56 forms a shape of a lower half of the battery pack 51. The battery tray 56 has nearly the same planar shape as the battery cover 55. The battery tray 56 is combined with the battery cover 55 to compose a casing of the battery pack 51 that houses therein the battery modules 52 and the like described above. The battery tray 56 has insertion holes 56a each for the collared bolt 59, which are formed at positions corresponding to the insertion holes 55a of the battery cover 55.

Moreover, the battery cover 55 and the battery tray 56 have a plurality of through holes H1 formed in respective peripheral parts. The through holes H1 are formed at positions corresponding to each other in the battery cover 55 and the battery tray 56. When the battery cover 55 and the battery tray 56 are combined with each other to be closed, bolts (not shown) for fastening the battery cover 55 and the battery tray 56 to each other are inserted through the through holes H1.

The battery frame 57 includes the battery cross members 58 that extend in the vehicle width direction in the battery pack 51.

The battery cross member 58 in the present embodiment is composed of a first battery cross member 58a that extends in the vehicle width direction at the front side in the battery pack 51, and a second battery cross member 58b that extends in the vehicle width direction at the rear side of the first battery cross member 58a. Note that in the description below, when the first battery cross member 58a and the second battery cross member 58b need not be distinguished from each other, they are merely referred to as the battery cross member 58.

The first battery cross member 58a is formed with insertion holes 58a1 each for the collared bolt 59. The insertion holes 58a1 are formed at positions corresponding to the fastening parts 32 (see FIG. 1) of the first floor cross member 31a (see FIG. 1).

The second battery cross member 58b is formed with insertion holes 58b1 each for the collared bolt 59. The insertion holes 58b1 are formed at positions corresponding to the fastening parts 32 (see FIG. 1) of the second floor cross member 31b (see FIG. 1).

Moreover, the battery cross member 58 thus configured is formed with the rib R1 (see FIG. 12) that extends along the vehicle width direction inside a cross section of the battery cross member 58 as described later.

The battery frame 57 further includes a battery center cross member 57a that extends in the vehicle width direction between the first battery cross member 58a and the second battery cross member 58b.

Moreover, the battery frame 57 further includes four connecting members 57b that extend in the front-rear direction so as to connect the first battery cross member 58a, the second battery cross member 58b, and the battery center cross member 57a to one another. Incidentally, two of the four connecting members 57b are disposed at right and left ends in the battery pack 51, respectively. Moreover, the remaining two are disposed to be lined up at the central part in the vehicle width direction in the battery pack 51.

<Battery Side Frame>

As shown in FIG. 9, the battery side frame 61 is disposed between the side sill 11 and the battery pack 51.

Moreover, as shown in FIG. 10, the battery side frame 61 extends in the front-rear direction along the outer side in the vehicle width direction of the battery pack 51.

Moreover, as shown in FIG. 11, the battery side frame 61 is formed with tapped holes H2 into which bolts (not shown) are screwed, the bolts being inserted through the through holes H1 that are formed at respective right and left ends of the battery cover 55 and the battery tray 56.

The battery side frame 61 is also formed with insertion holes H3 each for the bolt 40a (see FIG. 2) for fastening the battery side frame 61 to the supporting part 16c (see FIG. 2) of the side sill (see FIG. 2).

Note that in FIG. 11, reference sign 64 denotes a cross beam that extends in the vehicle width direction between rear ends of the right and left battery side frames 61, 61. The cross beam 64 is formed with tapped holes H4 into which bolts (not shown) are screwed, the bolts being inserted through the through holes H1 that are formed at respective rear ends of the battery cover 55 and the battery tray 56.

Figure 12:
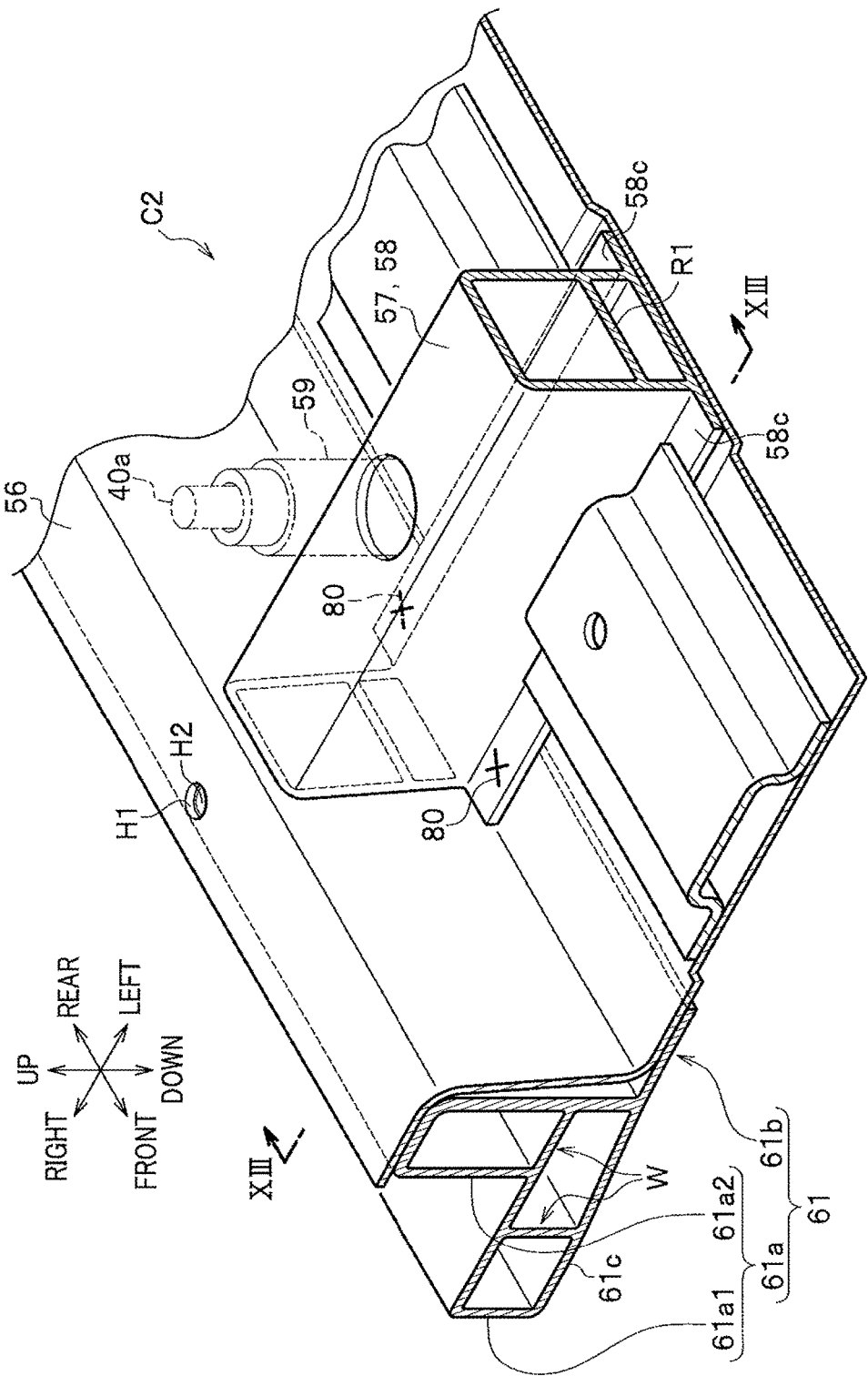
FIG. 12 is a partial perspective view showing a joining relationship between the battery side frame, and a battery tray and the battery cross member, in a part indicated by an arrow mark XII in FIG. 10, and is a view showing a state in which the vicinity of the part indicated by the arrow mark XII is looked down from a right oblique rear and upper side of the vehicle body.

FIG. 12 to be next referred to is a partial perspective view showing a joining relationship between the battery side frame 61, and the battery tray 56 and the battery cross member 58, in the part indicated by an arrow mark XII in FIG. 10, and is a view showing a state in which the vicinity of the part indicated by the arrow mark XII is looked down from a right oblique rear and upper side of the vehicle body. Moreover, FIG. 12 includes a sectional view of the battery side frame 61, the battery tray 56, and the battery cross member 58.

As shown in FIG. 12, the battery side frame 61 is composed of a block part 61a having an L-shaped cross section which includes hollow parts divided by a plurality of partition walls W, and a supporting part 61b for the battery pack 51 (see FIG. 9), composed of a rib that extends from a lower end of the inner side (left side in FIG. 12) in the vehicle width direction of the block part 61a toward the further inner side in the vehicle width direction.

The block part 61a forms the L-shaped cross section described above by a base part 61a1 and a vertical wall part 61a2 that rises nearly vertically from the base part 61a1.

The insertion holes H3 (see FIG. 11) each for the bolt 40a (see FIG. 2) are formed in an upper part of the base part 61a1. Moreover, the tapped holes H2 (see FIG. 11) into each of which the bolt 40a (see FIG. 2) is screwed are formed in an upper part of the vertical wall part 61a2. In FIG. 12, reference sign H1 denotes the through hole described above formed in the battery tray 56.

Each of end faces in the vehicle width direction of the battery cross member 58 composing the battery frame 57 faces through the battery tray 56 to an inner face in the vehicle width direction of the battery side frame 61.

The battery cross member 58 in the present embodiment has the rib R1 extending along the vehicle width direction inside the cross section thereof as described above. More specifically, the battery cross member 58 has a rectangular closed cross section including a hollow part, and the rib R1 extends nearly horizontally so as to partition the hollow part of the battery cross member 58 vertically. Note that, although not illustrated, the rib R1 is formed with an insertion hole for the collared bolt 59 at a part corresponding to a part of the battery cross member 58 through which the collared bolt 59 passes.

In FIG. 12, reference sign 58C denotes a flange of the battery cross member 58, and reference sign 80 denotes a fastening spot of the battery cross member 58 for the battery side frame 61.

Figure 13:
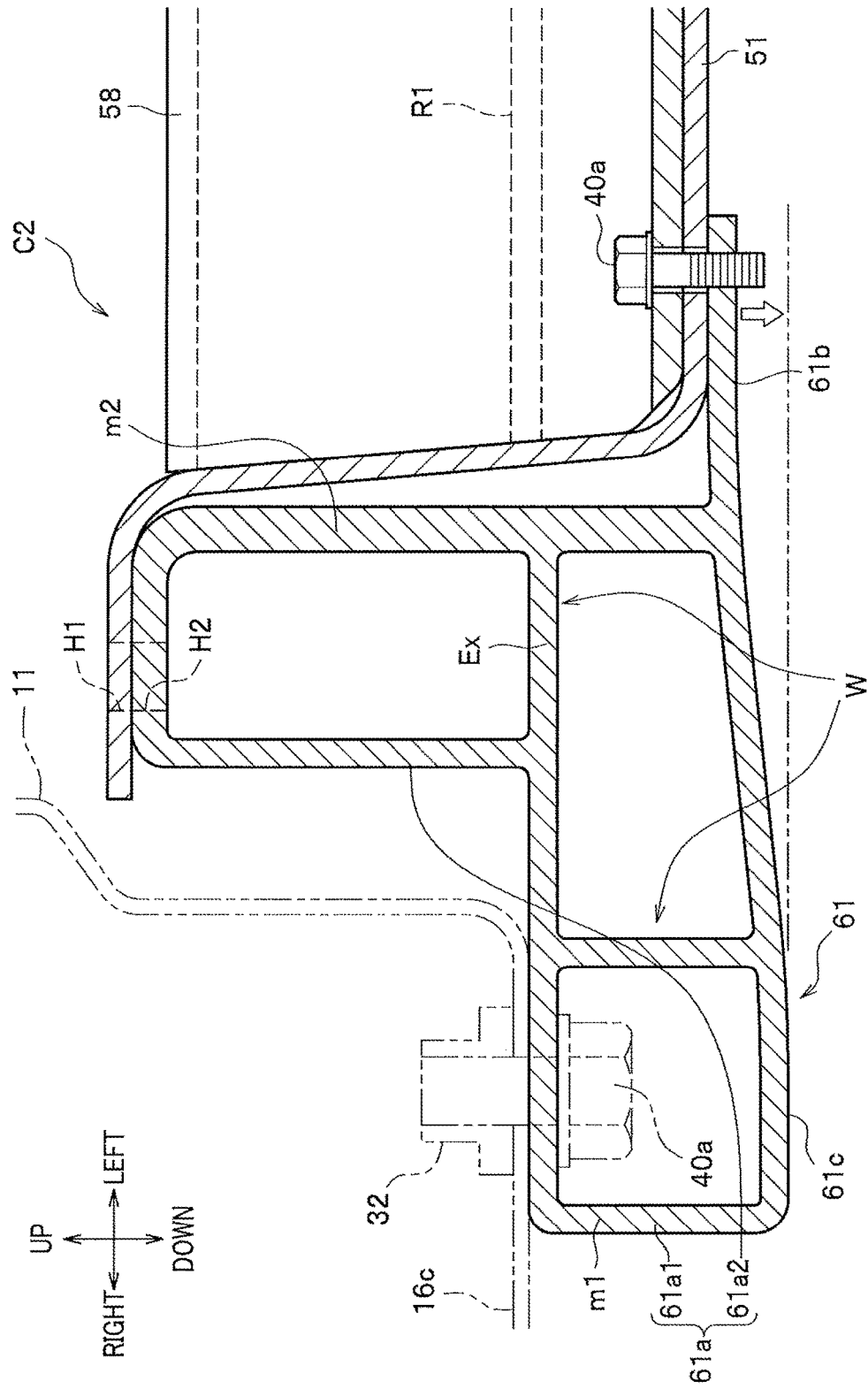
FIG. 13 is a sectional view taken along line XIII-XIII in FIG. 12.

FIG. 13 is a sectional view taken along line XIII-XIII in FIG. 12. Moreover, in FIG. 13, the supporting part 16c for the battery side frame 61 in the side sill 11 is shown by a virtual line (two-dot chain line).

As shown in FIG. 13, the battery pack structure C2 according to the present embodiment allows the lower surface 61c of the battery side frame 61 located on the outer side in the vehicle width direction to be located at the lower side than the supporting part 61b for the battery pack 51 in the battery side frame 61 formed on the inner side in the vehicle width direction.

Moreover, in the battery pack structure C2 according to the present embodiment, the rib R1 of the battery cross member 58 extends in the vehicle width direction. Further, the supporting part 16c for the battery side frame 61 formed in the side sill 11 is set to be on a position which overlaps with an extended line of the rib R1.

Moreover, in the battery pack structure C2 according to the present embodiment, the partition wall W extending horizontally, of the partition walls W partitioning the hollow parts of the battery side frame 61, composes an extension part Ex extending from the supporting part 16c toward the inner side in the vehicle width direction. Further, the extension part Ex is formed at a position which overlaps with the extended line of the rib R1.

Moreover, in the battery pack structure C2 according to the present embodiment, the supporting part 61b for the battery pack 51 in the battery side frame 61, and the battery cross member 58 are joined to each other through the bolt 40a in the up-down direction.

Moreover, in the battery pack structure C2 according to the present embodiment, the battery side frame 61 allows the inner side in the vehicle width direction thereof to be set so as to a have a higher strength than that of the outer side in the vehicle width direction thereof. More specifically, the battery side frame 61 allows a structural member m2 disposed at the inner side in the vehicle width direction thereof to be thicker than a structural member m1 disposed at the outer side in the vehicle width direction thereof.

Incidentally, the strength difference between the inner side in the vehicle width direction and the outer side in the vehicle width direction is not limited to what is due to thicknesses of the structural members described above. Therefore, the strength difference between the inner side in the vehicle width direction and the outer side in the vehicle width direction can also be set by using two or more kinds of structural members having different strength differences. Moreover, the above strength difference can also be set by reinforcing a part near the outer side in the vehicle width direction of the battery side frame 61. There is no particular limitation as the form of reinforcement, but a three-dimensional structure such as ribs, grooves or the like, formation of a hard film on the surface of the battery side frame 61, and the like can be adopted.

The above strength difference can also be set stepwise from the inner side in the vehicle width direction toward the outer side in the vehicle width direction of the battery side frame 61, or can also be set to allow the strength to be gradually increased.

Next, description will be given of operation and effects produced by the battery pack structure C2.

The battery pack structure C2 according to the present embodiment allows the lower surface 61c of the battery side frame 61 located on the outer side in the vehicle width direction to be located at the lower side than the supporting part 61b for the battery pack 51.

The battery pack structure C2 thus configured makes it possible to decrease a force which is caused by a load input inside collision and by which the battery side frame 61 is about to bend upward.

Figure 14A:
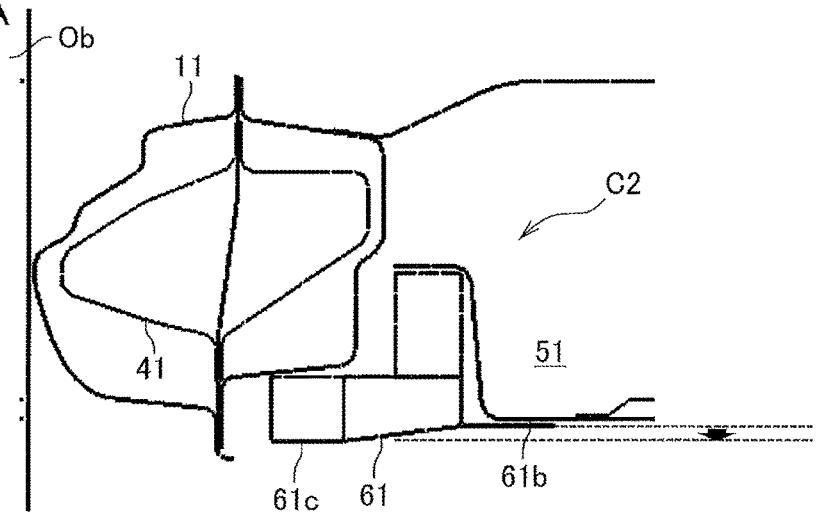
FIGS. 14A to 14C are schematic diagrams each showing a state in which the battery side frame is deformed when a load in side collision is input to the battery pack structure according to the embodiment of the present invention.
Figure 14B:
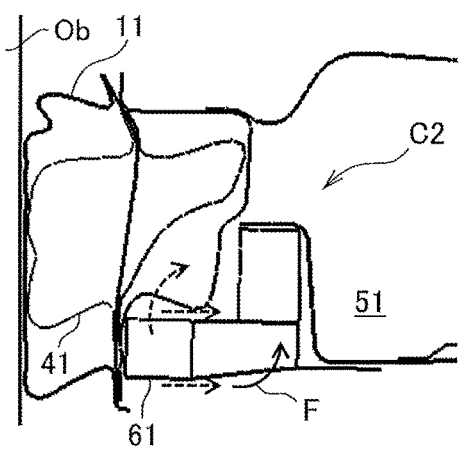
Figure 14C:
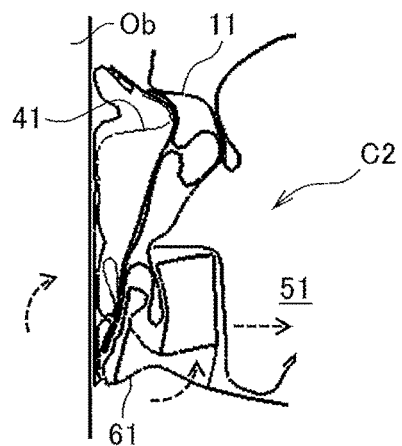

FIGS. 14A to 14C are schematic diagrams each showing a state in which the battery side frame 61 is deformed when a load in side collision is input to the battery pack structure C2 according to the present embodiment.

Figure 15A:
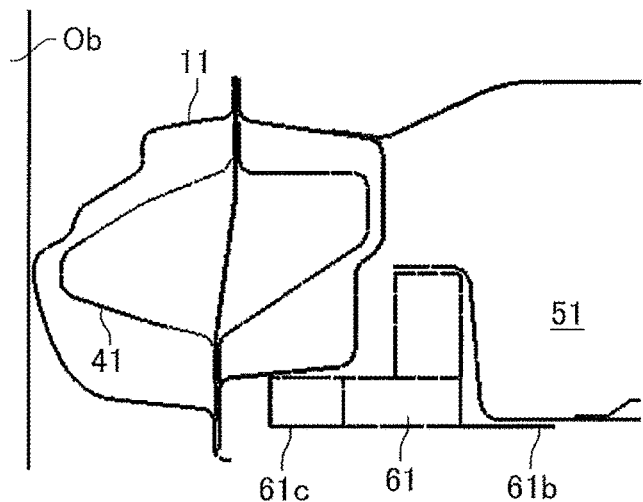
FIGS. 15A to 15C are schematic diagrams each showing a reference example for comparison with the battery pack structure according to the embodiment of the present invention.
Figure 15B:
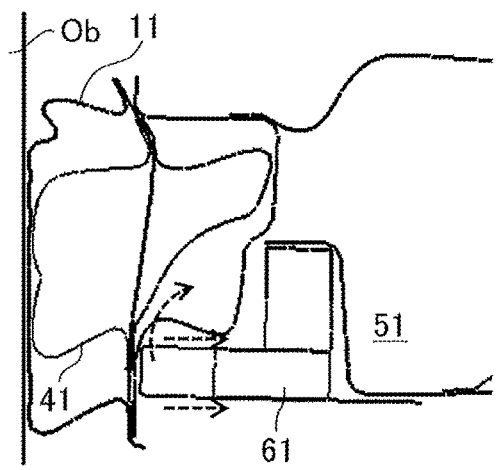
Figure 15C:
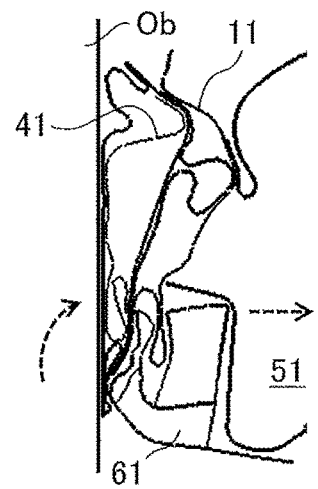

FIGS. 15A to 15C are schematic diagrams each showing a reference example for comparison with the battery pack structure C2 according to the present embodiment.

As shown in FIGS. 14A to 14C, the battery pack structure C2 according to the present embodiment allows the lower surface 61c of the battery side frame 61 to be located at the lower side than the supporting part 61b in the battery side frame 61 as described above. When a load in side collision is input via the object Ob to the side sill 11, the lower surface of the side sill 11 is deformed as shown in FIG. 14B, thereby causing a force which is about to raise the outer side in the vehicle width direction of the battery side frame 61 upward. While on the other hand, a bending stress of the battery side frame 61 is generated in a direction of arrow mark F in FIG. 14B because the lower surface 61c is located at the lower side than the supporting part 61b.

This makes it possible, as shown in FIG. 14C, to cancel the above force which is about to raise the outer side in the vehicle width direction of the battery side frame 61 upward, and thus to suppress displacement of the battery side frame 61 to the upper side. Therefore, the battery pack structure C2 makes it possible to more reliably protect the battery pack 51 in side collision of the vehicle.

In contrast, the battery side frame 61 in the reference example has no difference in height between the supporting part 61b and the lower surface 61c as shown in FIG. 15A. Consequently, when a force which is about to raise the outer side in the vehicle width direction of the battery side frame 61 upward is caused as shown in FIG. 15B, unlike the case of FIG. 14B, no bending stress is generated in the direction of arrow mark F.

Therefore, the battery side frame 61 in the reference example is deformed to allow the outer side in the vehicle width direction thereof to be raised up as shown in FIG. 15C.

That is, the battery pack structure C2 according to the present embodiment shown in FIG. 14A has excellent properties of transmission of the load to the inner side in the vehicle width direction, as compared to the reference example shown in FIG. 15A.

Moreover, in the battery pack structure C2 according to the present embodiment, the rib R1 of the battery cross member 58 extends in the vehicle width direction. Further, the supporting part 16c for the battery side frame 61 formed in the side sill 11 is set to be on a position which overlaps with an extended line of the rib R1.

The battery pack structure C2 thus configured makes it possible to allow a load input via the side sill 11 in side collision to be efficiently transmitted through the battery side frame 61 to the battery cross member 58.

Moreover, in the battery pack structure C2 according to the present embodiment, the partition wall W extending horizontally, of the partition walls W partitioning the hollow parts of the battery side frame 61, composes the extension part Ex extending from the supporting part 16c toward the inner side in the vehicle width direction. Further, the extension part Ex is formed at the position which overlaps with the extended line of the rib R1.

The battery pack structure C2 thus configured makes it possible to allow a load input via the side sill 11 in side collision to be efficiently transmitted through the battery side frame 61 to the rib R1.

Moreover, in the battery pack structure C2 according to the present embodiment, the supporting part 61b for the battery pack 51 in the battery side frame 61, and the battery cross member 58 are joined to each other through the bolt 40a in the up-down direction.

The battery pack structure C2 thus configured is excellent in a transmission efficiency of the load to the inner side in the vehicle width direction because the battery side frame 61 and the battery pack 51 come into surface contact with each other in side collision.

Moreover, in the battery pack structure C2 according to the present embodiment, the battery side frame 61 allows the inner side in the vehicle width direction thereof to be set so as to a have a higher strength than that of the outer side in the vehicle width direction thereof.

The battery pack structure C2 thus configured makes it possible to reduce the amount of intrusion of the side sill 11 toward the inner side in the vehicle width direction by the high strength at the inner side in the vehicle width direction, while securing a stroke in side collision at the outer side in the vehicle width direction of the battery side frame 61.

Although the present embodiment has been described above, the present invention is not limited to the embodiment described above, and can be carried out through a variety of embodiments.

The scope of the present invention should be interpreted by terms of the appended claims.

DESCRIPTION OF REFERENCE SIGNS

11: Side sill; 12: Outer panel; 13: Inner panel; 14: Supporting panel; 16c: Supporting part; 20: Dashboard lower; 21: Floor panel; 31: Floor cross member; 31a: First floor cross member; 31b: Second floor cross member; 41: Stiffener; 42: Outer stiffener; 43: Inner stiffener; 44b1: Bead; 44a: First side surface; 44b: First upper surface; 44c: First lower surface; 45b1: Bead; 45a: Second side surface; 45b: Second upper surface; 45c: Second lower surface; 51: Battery pack; 57: Battery frame; 58: Battery cross member; 58a: First battery cross member; 58b: Second battery cross member; 61: Battery side frame; 61b: Supporting part; 61c: Lower surface; B: Vehicle body; C: Substructure; C1: Side sill structure; C2: Battery pack structure; Ex: Extension part; R1: Rib; R2: Rib; S: Horizontal plane

What is claimed is:

1. A substructure of a vehicle body, comprising:
a battery pack that is disposed below a floor panel;
at least one side sill that is disposed at an outer part in a width direction of the vehicle body and extends in a front-rear direction of the vehicle body; and
a stiffener that is disposed inside a cross section of the side sill and extends along an extending direction of the side sill,
the stiffener being composed of an outer stiffener that has a nearly hat-shaped cross section and bulges outward in the width direction of the vehicle body, and an inner stiffener that has a nearly hat-shaped cross section and bulges inward in the width direction of the vehicle body, wherein
an upper flange and a lower flange provided at upper and lower ends of the outer stiffener, respectively, and an upper flange and a lower flange provided at upper and lower ends of the inner stiffener, respectively, are supported on the side sill through a supporting panel disposed in the side sill, and a first side surface of the stiffener, which is formed on the inner stiffener, is shifted to a relatively upper side than a second side surface of the stiffener, which is formed on the outer stiffener, and
the battery pack is supported on a lower surface of the side sill.

2. The substructure of the vehicle body, according to claim 1, further comprising
at least one floor cross member that is disposed at an inner part in the width direction of the vehicle body between inner stiffeners and extends in the width direction of the vehicle body, wherein
an angle which a lower surface of the inner stiffener forms with a horizontal plane on a narrow angle side thereof is greater than an angle which a lower surface of the outer stiffener forms with the horizontal plane on a narrow angle side thereof.

3. The substructure of the vehicle body, according to claim 2, wherein
the inner stiffener has at least one bead that is provided at a position corresponding to an end in an extending direction of the floor cross member and extends along the width direction of the vehicle body.

4. The substructure of the vehicle body, according to claim 1, wherein
the outer stiffener has at least one bead that is formed on at least one surface of upper and lower surfaces of the outer stiffener and extends along the width direction of the vehicle body.

5. A substructure of a vehicle body, comprising:
a battery pack that is disposed below a floor panel;
two side sills that are respectively disposed at opposite outer parts in a width direction of the vehicle body and each extend in a front-rear direction of the vehicle body; and
a stiffener that is disposed inside a cross section of each of the two side sills and extends along an extending direction of the respective side sill,
the stiffener being composed of an outer stiffener that has a nearly hat-shaped cross section and bulges outward in the width direction of the vehicle body, and an inner stiffener that has a nearly hat-shaped cross section and bulges inward in the width direction of the vehicle body, wherein
a first side surface of the stiffener, which is formed on the inner stiffener, is shifted to a relatively upper side than a second side surface of the stiffener, which is formed on the outer stiffener, and
the battery pack is supported on a side sill lower surface,
a pair of floor cross members are each disposed at an inner part in the width direction of the vehicle body between inner stiffeners and extend in the width direction of the vehicle body, the pair of floor cross members being disposed in the front-rear direction of the vehicle body,
an angle which a lower surface of the inner stiffener forms with a horizontal plane on a narrow angle side thereof is greater than an angle which a lower surface of the outer stiffener forms with the horizontal plane on a narrow angle side thereof, the inner stiffener has beads formed in a plurality of rows in the front-rear direction of the vehicle body and extending along the width direction of the vehicle body, only at positions corresponding to ends in the extending direction of the pair of floor cross members, and no bead is formed on a part of the inner stiffener which is located between the pair of floor cross members.

* * * * *